(12) United States Patent
Gupta et al.

(10) Patent No.: US 10,181,266 B2
(45) Date of Patent: Jan. 15, 2019

(54) SYSTEM AND METHOD TO PROVIDE DRIVING ASSISTANCE

(71) Applicant: SONY CORPORATION, Tokyo (JP)

(72) Inventors: Manish Gupta, Bengaluru (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/851,201

(22) Filed: Sep. 11, 2015

(65) Prior Publication Data

US 2017/0076606 A1    Mar. 16, 2017

(51) Int. Cl.
| | |
|---|---|
| *G08G 1/16* | (2006.01) |
| *B60K 35/00* | (2006.01) |
| *B60Q 9/00* | (2006.01) |
| *B60Q 1/00* | (2006.01) |
| *B60R 1/12* | (2006.01) |

(52) U.S. Cl.
CPC .............. *G08G 1/167* (2013.01); *B60K 35/00* (2013.01); *B60Q 1/0023* (2013.01); *B60Q 9/008* (2013.01); *B60R 1/12* (2013.01); *B60K 2350/1096* (2013.01); *B60K 2350/2013* (2013.01); *B60K 2350/2052* (2013.01); *B60K 2350/2056* (2013.01); *B60R 2001/1253* (2013.01)

(58) Field of Classification Search
None
See application file for complete search history.

(56) References Cited

U.S. PATENT DOCUMENTS

| | | | |
|---|---|---|---|
| 6,320,612 B1 | 11/2001 | Young | |
| 2006/0215020 A1* | 9/2006 | Mori | B60R 1/00 348/119 |
| 2012/0188374 A1* | 7/2012 | Taner | B60W 30/18163 348/148 |
| 2014/0132770 A1 | 5/2014 | Lee | |
| 2014/0222298 A1* | 8/2014 | Gurin | B60W 50/085 701/49 |

(Continued)

FOREIGN PATENT DOCUMENTS

| | | | |
|---|---|---|---|
| CN | 204845735 | * | 7/2015 |
| DE | 19749363 A1 | | 5/1999 |

(Continued)

OTHER PUBLICATIONS

EPO translation of Huang CN204845735 Dec. 15, 2017 (Year: 2017).*
International Search Report of PCT Application No. PCT/JP2016/003901, dated Dec. 1, 2016, 5 pages.

*Primary Examiner* — Kevin P Mahne
(74) *Attorney, Agent, or Firm* — Chip Law Group

(57) ABSTRACT

Various aspects of a system and method to provide driving assistance are disclosed herein. The system comprises one or more circuits in an electronic control unit used in a vehicle configured to detect one or more actions associated with the vehicle based on one or more signals generated by one or more sensors embedded in the vehicle. The electronic control unit may be further configured to control the activation of an imaging device located on the vehicle at an opposite side of a driver of the vehicle, based on the detected one or more actions. The imaging device is operable to capture one or more images in a forward-facing direction of the vehicle.

21 Claims, 13 Drawing Sheets

(56) References Cited

U.S. PATENT DOCUMENTS

| | | | |
|---|---|---|---|
| 2014/0376119 A1* | 12/2014 | Sobecki | B60R 1/074 359/841 |
| 2015/0350607 A1* | 12/2015 | Kim | H04N 7/181 348/148 |
| 2015/0365603 A1 | 12/2015 | Wahl et al. | |
| 2016/0193998 A1* | 7/2016 | Yellambalase | B60W 30/08 348/148 |

FOREIGN PATENT DOCUMENTS

| | | |
|---|---|---|
| DE | 102009040674 A1 | 7/2010 |
| DE | 102013201379 A1 | 7/2014 |
| JP | 2007-029904 A | 2/2007 |
| JP | 2008-205644 A | 9/2008 |
| WO | 2014/070276 A2 | 5/2014 |

* cited by examiner

SYSTEM AND METHOD TO PROVIDE DRIVING ASSISTANCE

FIELD

Various embodiments of the disclosure relate to a system to provide driving assistance. More specifically, various embodiments of the disclosure relate to a system to provide driving assistance by use of an imaging device, based on detection of one or more actions.

BACKGROUND

Recent advancements in the field of telematics have led to the development of systems that are able to assist a driver to maneuver a vehicle based on traffic conditions. For such assistance, current methods use rear-view cameras to capture the traffic conditions behind the vehicle while in motion. Based on the images captured by the rear-view cameras, the vehicle may be reasonably equipped to be maneuvered without any potential risk of an accident.

In certain scenarios, an ego vehicle may attempt to overtake or undertake a vehicle moving ahead of the ego vehicle. However, the field-of-view available to the driver of the ego vehicle may be limited due to the vehicle. Therefore, the driver of the ego vehicle may not have sufficient information about the road and/or traffic conditions present ahead of the vehicle. In other scenarios, the driver may be required to take a turn towards a passenger side of the ego vehicle. In case the turn is a tight turn and towards the inside part of the road, the view of the road and/or the road surface just beyond the turn may be limited due to the sharp angle of the turn. In such scenarios, the driver may not be able to visualize the road and/or the traffic conditions at the turn due to a blind spot towards the passenger side. Thus, it may be desirable by the driver to obtain sufficient information about the traffic condition present on the road surface. It may be further desirable by the driver to have sufficient information about the shoulder of the road on the inside of the turn towards the passenger side of the ego vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to provide driving assistance is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
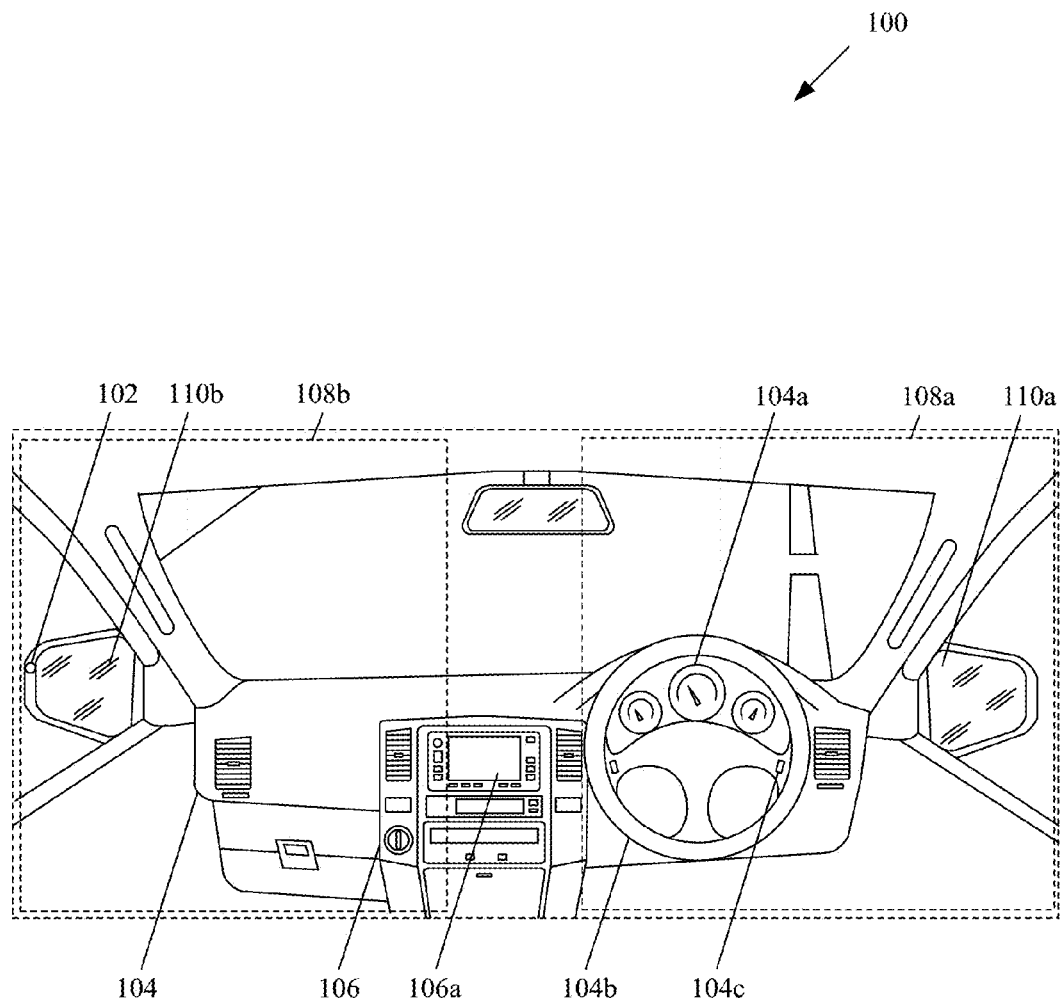
FIG. 1 is a block diagram that illustrates a vehicle infrastructure inside a vehicle to provide driving assistance, in accordance with an embodiment of the disclosure.

Various implementations may be found in a system and/or method to provide driving assistance. Exemplary aspects of the disclosure may comprise a method to provide driving assistance based on detection of one or more actions associated with the vehicle, by an electronic control unit used in the vehicle. The detection of the one or more actions may be based on one or more signals generated by one or more sensors embedded in the vehicle. The method may further comprise control of an activation of an imaging device located on the vehicle at an opposite side of a driver of the vehicle, by the electronic control unit used in the vehicle. The control of the activation of the imaging device may be based on the detected one or more actions. Further, the imaging device may be operable to capture one or more images in a forward-facing direction of the vehicle.

In accordance with an embodiment, the imaging device may be activated in an operational mode that corresponds to one of a first mode or a second mode. The first mode and the second mode may be based on at least the detected one or more actions and/or the captured one or more images by the imaging device. The first mode may be used when a front vehicle is surpassed and the second mode may be used when a turn is taken at an intersection. The activation of the imaging device may comprise adjustment of a line-of-sight of the imaging device.

In accordance with an embodiment, the imaging device may be activated to capture the one or more images in the forward-facing direction for the first mode to detect a front vehicle. The activation may be based on the detected one or more actions that comprise one or more of deceleration of the vehicle below a pre-defined speed threshold for first mode activation, selection of a manual button for the first mode activation, a lateral displacement of the vehicle above a pre-defined distance threshold for first mode activation, push of a brake pedal of the vehicle, an activation of a turn signal of the vehicle, a presence of another vehicle within a pre-defined proximity range of the vehicle, a low visibility associated with a view in a frontward direction of the vehicle, a low visibility associated with a view in a frontward direction from a driver, a blocking of the view by the another vehicle, a reduction in speed of the other vehicle to a value below a pre-defined speed threshold for first mode activation, and/or a change in a steering angle above a pre-defined angle threshold for first mode activation.

In accordance with an embodiment, the imaging device may be activated to capture the one or more images in a rearward-facing direction or a sideward-facing direction for the second mode to detect an obstacle or a life-form. The activation may be based on the detected one or more actions that comprise one or more of activation of a turn signal, selection of a manual button for the second mode activation, detection of a lane change by the vehicle, detection of an intersection in a direction of motion of the vehicle, detection of a turn at an intersection on an upcoming driving route set in a navigation application, detection of a reduction in speed of the vehicle to a value below a pre-defined speed threshold for second mode activation, detection of a change in a steering angle above a pre-defined angle threshold for second mode activation, and/or detection of a traffic signal.

In accordance with an embodiment, a display of the captured one or more images on a display screen of the vehicle may be controlled. Further an alert indication may be displayed with the captured one or more images when the captured one or more images correspond to another detected vehicle and/or a life-form.

In accordance with an embodiment, the adjustment of a line-of-sight of the activated imaging device may be controlled based on one or more road surface characteristics of a road surface beneath the vehicle. The one or more road surface characteristics may comprise one or more of an upward slope, a downward slope, a bank angle, a curvature, a boundary, a speed limit, a road texture, a pothole, and/or a lane marking.

In accordance with an embodiment, the control of the activation of the imaging device may be based on one or more of a voice based command, a gesture-based command, and/or a selection of a button disposed on a panel or a steering wheel of the vehicle. The display of the captured one or more captured images may be controlled by use of an infotainment display, a heads-up display (HUD), an augmented reality (AR)-HUD, a driver information console (DIC), a see-through display, or a smart-glass display.

In accordance with an embodiment, the deactivation of the activated imaging device may be based on one or more of acceleration of the vehicle above a pre-defined speed threshold for a mode deactivation, a lateral displacement of the vehicle below a pre-defined distance threshold for mode deactivation, an absence of one or more other vehicles from the captured one or more images, a change in the lateral displacement with respect to a time of activation of the imaging device, a change in a steering angle below an angle threshold for mode deactivation, a detection of a completion of a turning action of the vehicle at an intersection, deactivation of a turn signal, and/or selection of a manual button for the deactivation.

In accordance with an embodiment, information to indicate whether the vehicle can safely pass the front vehicle may be generated based on the activation of the imaging device. The generated information may comprise one or more of visual information, haptic information, and/or audio information. The detection of the one or more vehicles may be based on utilization of one or more of the imaging device, a radio wave-based object detection device, a laser-based object detection device, and/or a wireless communication device, for detection of one or more other vehicles.

In accordance with an embodiment, the imaging device may be mounted on or integrated into a passenger side rear-view mirror or an external body of the vehicle. In accordance with an embodiment, the imaging device may be adjustably mounted on the passenger side rear-view mirror or an external body of the vehicle to capture one or more images in a rearward-facing direction or a sideward-facing direction.

FIG. 1 is a block diagram that illustrates a vehicle infrastructure inside a vehicle to provide driving assistance, in accordance with an embodiment of the disclosure. With reference to FIG. 1, a vehicle 100 may include a vehicle infrastructure 100*a*. The vehicle infrastructure 100*a* may include an imaging device 102, a vehicle dashboard 104, and an infotainment system 106. The vehicle infrastructure 100*a* may further comprise sensing devices and a vehicle network that are illustrated and explained in detail in FIG. 2. The vehicle dashboard 104 may comprise an electronic instrument cluster 104*a*, a vehicle steering wheel 104*b*, and/or a set of operational mode buttons 104*c*. The infotainment system 106 may include a display device 106*a*. The infotainment system 106 may be communicatively coupled to the sensing devices, the imaging device 102, and the vehicle dashboard 104, via the vehicle network.

The imaging device 102 may comprise suitable logic, circuitry, interfaces, and/or code that may be operable to capture one or more images. The captured one or more images may correspond to the traffic and/or the road conditions in proximity to the vehicle 100. The imaging device 102 may be adjustably mounted on or integrated with a rear-view mirror 110*a* on a driver side 108*a* and/or another rear-view mirror 110*b* on an opposite side 108*b*, such as a passenger side, of the vehicle 100. In accordance with an embodiment, the imaging device 102 may be mounted on the external body of the vehicle 100. In accordance with an embodiment, the imaging device 102 may be integrated in the external body of the vehicle 100. In accordance with an embodiment, the imaging device 102 may extend outwards from the vehicle 100 and/or retract into the body of the vehicle 100 automatically or based on press of the set of operational mode buttons 104*c*. The automatic activation of the imaging device 102 in an operational mode may be based on one or more actions. In accordance with an embodiment, a line-of-sight of the imaging device 102 may be adjusted based on one or more input parameters and/or road characteristics. Examples of the imaging device 102 may include, but are not limited to, a dedicated front focus camera, an outside rear-view mirror (ORVM) camera, a motion camera, radio detection and ranging (RADAR) device coupled with a camera, and/or a light detection and ranging (LIDAR) device coupled with a camera.

The vehicle dashboard 104 may comprise suitable logic, circuitry, interfaces, and/or code that may be operable to facilitate various controls of the vehicle 100. The vehicle dashboard 104 may comprise the electronic instrument cluster 104*a*, the vehicle steering wheel 104*b*, and the set of operational mode buttons 104*c*. The electronic instrument cluster 104*a* may comprise one or more instruments that may be operable to display first information measured by the sensing devices in a user-readable format. Examples of the one or more instruments may include, but are not limited to, a speedometer, an odometer, a tachometer, and/or a fuel gauge. The vehicle steering wheel 104*b* may be a combination of a series of linkages, rods, pivots and gears that may control the direction of the vehicle 100. The vehicle steering wheel 104*b* may be operable to provide haptic feedback, computed by a processor in the vehicle 100, to the driver. The vehicle steering wheel 104*b* may comprise the set of operational mode buttons 104*c* that may be operable to switch between operational modes of the imaging device 102. Based on a manual depression of one or more of the set of operational mode buttons 104*c*, the vehicle infrastructure 100*a* may be operable to activate or deactivate the imaging device 102, in accordance with an operational mode of the imaging device 102.

The infotainment system 106 may comprise suitable logic, circuitry, interfaces, and/or code that may be operable to render an electronic output by use of one or more output devices, such as the display device 106*a*. The electronic output may comprise a video stream, an audio alert, a graphical icon, and/or a multimedia object. The display device 106*a* may further be operable to render one or more features and/or applications of the vehicle infrastructure 100*a*. In accordance with an embodiment, the display device 106*a* may be a touch-sensitive screen that may be operable to receive an input parameter from the one or more users, such as the driver of the vehicle 100. Such an input parameter may be received by means of a virtual keypad, a stylus, a touch-based input, and/or a gesture. Examples of the display device 106a may include, but are not limited to, an Augmented Reality—Head-up Display (AR-HUD), a Liquid Crystal Display (LCD) display, a Light Emitting Diode (LED) display, and/or an Organic LED (OLED) display technology. The infotainment system 106 may be implemented based on one or more technologies known in the art.

The vehicle network may include a medium through which the sensing devices, the imaging device 102, the vehicle dashboard 104, and the infotainment system 106, communicate with each other. Various standard formats may be defined for the interchange of messages between the sensing devices and the imaging device 102. Such standard formats may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD)-based data communication protocol, Inter-Integrated Circuit (I²C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or a Local Interconnect Network (LIN).

In operation, the vehicle infrastructure 100a may correspond to the vehicle 100 moving on a road surface. The road surface may correspond to one of a single-lane carriageway or a highway that may include lane markings. The road surface may comprise a plurality of lanes. In accordance with an embodiment, the plurality of lanes may be meant for a set of vehicles that travel in the same direction. In accordance with an embodiment, a first half of the plurality of lanes may be meant for a first set of vehicles that travel in a first direction. Further, a second half of the plurality of lanes may be meant for a second set of vehicles that travel in a second direction, opposite to the first direction. In such a case, the first half and the second half of the plurality of lanes on the road may be differentiated based on road divider lane markings.

The vehicle infrastructure 100a may comprise the imaging device 102. In accordance with an embodiment, the imaging device 102 may be mounted on the passenger side rear-view mirror. In accordance with an embodiment, the imaging device 102 may be mounted on the external body of the vehicle 100. The imaging device 102 may be integrated in the external body of the vehicle 100. The imaging device 102 may extend outwards from the vehicle and/or retract into the body of the vehicle 100 automatically or based on press of the set of operational mode buttons 104c. The automatic activation of the imaging device 102 in an operational mode may be based detected on one or more actions. In accordance with an embodiment, the imaging device 102 may be integrated into the passenger side rear-view mirror or the external body of the vehicle 100. In accordance with an embodiment, the imaging device 102 may be adjustably mounted on the passenger side rear-view mirror or the external body of the vehicle 100. Further, the imaging device 102 may be operable to capture one or more images in a rearward-facing direction or a sideward-facing direction of the vehicle 100.

In accordance with an embodiment, the sensing devices may be operable to detect first information and/or second information that correspond to the vehicle 100 moving on the road surface. In accordance with an embodiment, the first information may be detected when the motion of the vehicle 100 is in a rectilinear direction. The first information may be one or more of a rate of deceleration of the vehicle 100, a lateral displacement of the vehicle 100 above a pre-defined distance threshold for first mode activation, push of a brake pedal of the vehicle 100, an activation of a turn signal of the vehicle 100, a presence of another vehicle within a pre-defined proximity range of vehicle 100, a low visibility associated with a view in a frontward direction of the vehicle 100 from the driver, a blocking of a frontward view of the vehicle 100 by another vehicle, a reduction in speed of other vehicle to a value below a pre-defined speed threshold for first mode activation, and/or a change in a steering angle of the vehicle 100, above a pre-defined angle threshold for first mode activation.

In accordance with an embodiment, the second information may be detected when a turn is negotiated by the vehicle 100 towards the passenger side. The second information may correspond to one or more of turn signal activation, a detection of a lane change by the vehicle 100, and/or a detection of a reduction in speed of the vehicle 100 to a value below a pre-defined speed threshold for second mode activation. The second information may further correspond to a detection of a change in a steering angle above a pre-defined angle threshold for second mode activation and/or detection of a traffic signal. In accordance with an embodiment, the second information may further correspond to a turn of a road towards the passenger side detected in association with the geographical coordinates of the road.

In accordance with an embodiment, the first information and/or the second information may correspond to an action manually performed by the user, such as the driver of the vehicle 100. Such a manually performed user action may comprise activation of one or more of the set of operational mode buttons 104c dedicated for activation and/or deactivation of the imaging device 102, in an operational mode. The manually performed user action may further comprise a set of voice based commands provided to the infotainment system 106 and/or a combination of pre-defined gestures detected by the infotainment system 106 for activation and/or deactivation of the imaging device 102, in the operational mode.

In accordance with an embodiment, based on the detected first information and/or the second information, the vehicle infrastructure 100a may be operable to control the activation of the imaging device 102 in an operational mode. The operational mode may correspond to one of a turn assistance mode or a surpass assistance mode. In the turn assistance mode, the orientation of the imaging device 102 may be sideward-facing, rearward-facing, and/or downward-facing with respect to the direction of motion of the vehicle 100. In the surpass assistance mode, the orientation of the imaging device 102 may be forward-facing with respect to the direction of motion of the vehicle 100. In accordance with an embodiment, the control of the activation of the imaging device 102 in one of the operational modes may be based on a voice-based command or a gesture-based command, provided by the user, such as the driver of the vehicle 100.

In accordance with an embodiment, the imaging device 102 may be operable to switch from one operational mode, such as the surpass assistance mode, to the other operational mode, such as the turn assistance mode. Such a change in the operational mode may be based on an input parameter provided by the user, the detected first information, and/or the detected second information.

Based on the activation of the imaging device 102 in one of the operational modes, the imaging device 102 may be operable to initiate the capture of one or more images. In accordance with an embodiment, a pre-configured timer may be initiated at an instant when the operational mode is activated.

In accordance with an embodiment, control information about the activation of the imaging device 102 may be transmitted to the vehicle dashboard 104, via the vehicle network. The electronic instrument cluster 104a may be operable to display an icon, based on activation of the imaging device 102 in the operational mode. In accordance with an embodiment, the vehicle dashboard 104 may be further operable to provide haptic feedback on the vehicle steering wheel 104b, based on the activation of the imaging device 102 in the operational mode. In accordance with an embodiment, the vehicle dashboard 104 may be further operable to illuminate a notification indicator integrated with the set of operational mode buttons 104c to notify the driver that the imaging device 102 is in an activated state.

In accordance with an embodiment, the one or more images captured by the activated imaging device 102 may be transmitted to the infotainment system 106, via the vehicle network. The infotainment system 106 may be operable to render the captured one or more images at the display device 106a.

In accordance with an embodiment, the user may provide one or more input parameters to control the activated imaging device 102. In accordance with an embodiment, the one or more input parameters may correspond to a command to perform zoom-in and/or zoom-out operation on the captured one or more images. In accordance with an embodiment, the one or more input parameters may correspond to a command to adjust a line-of-sight of the activated imaging device 102 with respect to a road surface beneath the vehicle 100. In accordance with an embodiment, the line-of-sight of the activated imaging device 102 may be adjusted, based on one or more road surface characteristics, such as an upward slope, a downward slope, and/or a bank angle of the road surface.

In accordance with an embodiment, the vehicle infrastructure 100a may be operable to detect one or more other vehicles from the captured one or more images. The detected one or more other vehicles may be present within a pre-defined proximity range of the vehicle 100. In accordance with an embodiment, the vehicle infrastructure 100a may be further operable to detect one or more objects that may include, but are not limited to, a pavement alongside the road surface beneath the vehicle 100, an upcoming vehicle alongside a shoulder of the road surface, a curvature of the road surface ahead in a direction of motion of the vehicle 100, another vehicle in front of the vehicle, a pothole, a speed breaker, a rock, a human subject, and/or a turn towards passenger side of the vehicle 100. In accordance with an embodiment, the detection of the one or more other vehicles and/or the one or more objects may be based on one or more of a radio wave-based object detection device, a laser-based object detection device, and/or a wireless communication device.

In accordance with an embodiment, based on the detected one or more other vehicles, the vehicle infrastructure 100a may be operable to generate an alert indication along with the rendered one or more images at the display device 106a. The generated alert indication along with the rendered one or more images may be removed from the display device 106a, when the one or more other vehicles is no longer detected by the vehicle infrastructure 100a.

In accordance with an embodiment, the vehicle infrastructure 100a may be operable to generate passage information. The generated passage information may indicate availability of a passage to allow the detected one or more other vehicles to be surpassed, when imaging device 102 is activated in surpass assistance mode. The generated safe passage information may be further rendered at the display device 106a. In accordance with an embodiment, an icon that indicates the availability of the safe passage may be displayed on one of the electronic instrument cluster 104a. In accordance with an embodiment, haptic feedback may be provided at the vehicle steering wheel 104b to indicate the availability of the safe passage. In accordance with an embodiment, a notification indicator, integrated with the set of operational mode buttons 104c, may be illuminated to notify the availability of the safe passage.

In accordance with an embodiment, the vehicle infrastructure 100a may be operable to generate obstacle information that may indicate the presence of the detected one or more objects, when imaging device 102 is activated in turn assistance mode. In accordance with an embodiment, the presence of detected one or more objects may be rendered at the display device 106a. In accordance with an embodiment, the electronic instrument cluster 104a at the vehicle dashboard 104 may be operable to display an icon as an alert indication that indicates the presence of the detected one or more objects. In accordance with an embodiment, haptic feedback may be provided at the vehicle steering wheel 104b as an alert indication, to indicate the presence of the detected one or more objects.

In accordance with an embodiment, the vehicle infrastructure 100a may be operable to deactivate the imaging device 102, based on the detection of other information associated with the vehicle. The other information may be complimentary with respect to the first information and/or the second information. In accordance with an embodiment, the activated imaging device 102 may be deactivated when duration of the initiated timer exceeds a pre-defined period of time. In accordance with an embodiment, the activated imaging device 102 may be deactivated by the vehicle infrastructure 100a, based on detection of one or more other actions manually performed by the driver. The one or more other actions may be complimentary to the one or more actions performed for the activation of the imaging device 102. Further, upon deactivation, the capture of the one or more images by the imaging device 102 may be stopped. Further, upon deactivation, the imaging device 102 may be rotated back to a rearward-facing orientation from a forward-facing orientation or a sideward-facing orientation. In accordance with an embodiment, upon deactivation, the orientation of the imaging device 102 may be changed to an orientation of the imaging device 102 before the activation.

Figure 2:
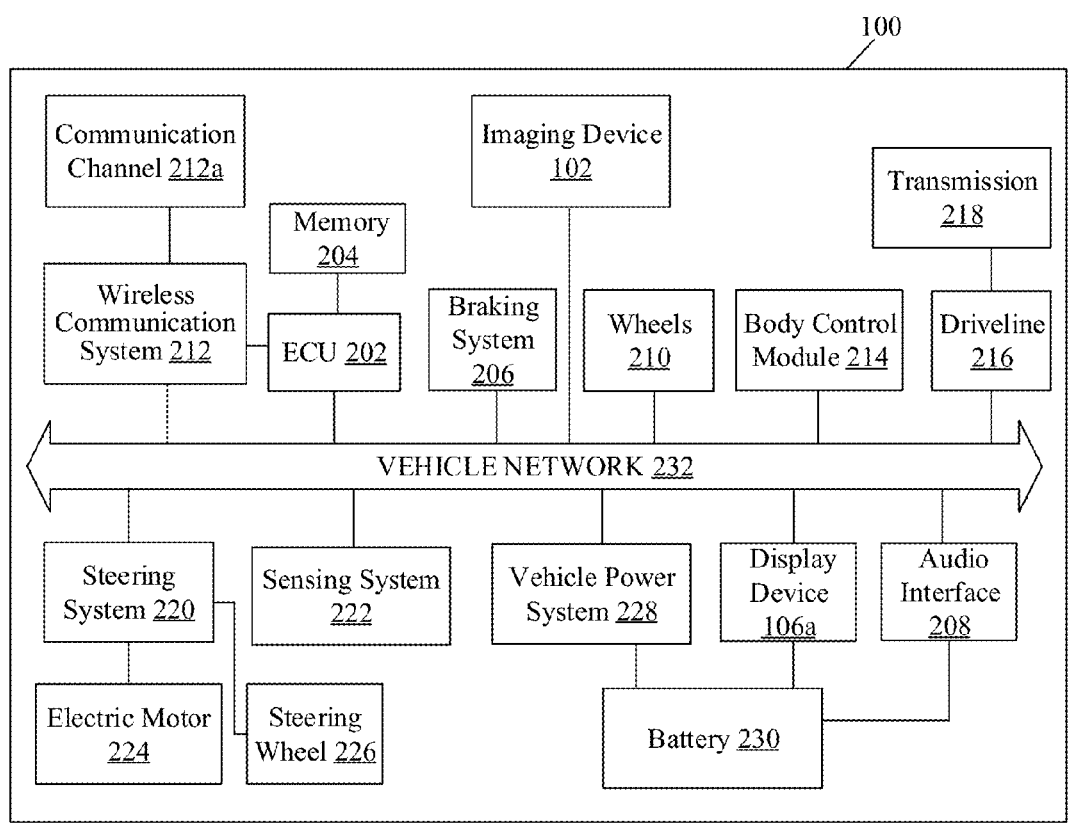
FIG. 2 is a block diagram that illustrates various exemplary components and systems of a vehicle, in accordance with an embodiment of the disclosure.

FIG. 2 is a block diagram that illustrates various exemplary components and systems of a vehicle, in accordance with an embodiment of the disclosure. FIG. 2 is explained in conjunction with elements from FIG. 1. With reference to FIG. 2, there is shown the vehicle 100. The vehicle 100 may comprise the ECU 202 that may include a memory 204. The vehicle 100 may further comprise a braking system 206, an audio interface 208, wheels 210, a wireless communication system 212, a body control module 214, a driveline 216, a steering system 220, a sensing system 222, and a vehicle power system 228. The driveline 216 may include a transmission system 218. The wireless communication system 212 may include a communication channel 212a. The steering system 220 may include an electric motor 224 and a steering wheel 226. The vehicle power system 228 may include a battery 230. The vehicle 100 may further comprise the imaging device 102 and the display device 106a, as explained in FIG. 1.

The various components and systems may be communicatively coupled via the vehicle network 232. The ECU 202 may be communicatively coupled to the memory 204, the imaging device 102, the braking system 206, the audio interface 208, the display device 106a, the wheels 210, the wireless communication system 212, the body control module 214, the driveline 216, the steering system 220, the sensing system 222, and the vehicle power system 228, via the vehicle network 232. The wireless communication system 212 may be configured to communicate with one or more other vehicles, via the communication channel 212a. It should be understood that the vehicle 100 may also include other suitable components and systems, but for the sake of brevity, those components and systems which are used to describe and explain the function and operation of the present disclosure are illustrated herein.

The ECU 202 may comprise suitable logic, circuitry, interfaces, and/or code that may be operable to execute a set of instructions stored in the memory 204. The ECU 202 may be implemented, based on a number of processor technologies known in the art. Examples of the ECU 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be operable to store a machine readable code and/or a computer program with at least one code section executable by the ECU 202. The memory 204 may be operable to store a navigation application that may indicate a map and the route of the road on which the vehicle travels. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The braking system 206 may refer to a system used to stop or slow down the vehicle 100 by application of frictional forces. The braking system 206 may be configured to receive a command from the body control module 214 or the ECU 202 based on detected one or more actions and/or one or more captured images.

The audio interface 208 may refer to a speaker, chime, buzzer, or other device to generate sound. The audio interface 208 may also refer to a microphone or other device to receive a voice input from an occupant of the vehicle 100, such as the driver of the vehicle 100. The display device 106a may refer to a touch screen that may be operable to render the one or more images, captured by the imaging device 102. The display device 106a may be further operable to render one or more input parameters that may correspond to an operational mode in which the imaging device 102 is activated. The display device 106a may be further operable to render the generated output based on the processing of the first information and/or the second information by the ECU 202. The generated output may comprise a video stream that may be rendered at the display device 106a to receive an input from the user and to display various types of information to occupants of the vehicle 100. Examples of the display device 106a may include, but are not limited to a heads-up display (HUD) or a head-up display with an augmented reality system (AR-HUD), a driver information console (DIC), a projection-based display, and/or an electro-chromic display.

The wheels 210 may be associated with one or more sensors of the sensing system 222, such as wheel speed sensors or odometric sensors to estimate change in position of the vehicle 100 over time. The odometric sensors may be provided on one or more of the wheels 210 of the vehicle 100 and/or in the driveline 216 of the vehicle 100. The braking system 206 may be associated with the wheel speed sensors or the odometric sensors.

The wireless communication system 212 may comprise suitable logic, circuitry, interfaces, and/or code that may be operable to communicate with one or more other vehicles, via the communication channel 212a. The wireless communication system 212 may include, but is not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card. The communication channel 212a may include a medium through which the wireless communication system 212 of the vehicle 100 may communicate with a wireless communication system of one or more other vehicles. Examples of the communication channel 212a may include, but are not limited to, a cellular network, such as a long-term evolution (LTE) network, a Wireless Fidelity (Wi-Fi) network, a Wireless Local Area Network (WLAN), the Internet, a dedicated short-range communication (DSRC) network, a mobile ad-hoc network (MANET), a vehicular ad-hoc network (VANET), and/or a Metropolitan Area Network (MAN). Examples of the second communication protocol, such as a wireless communication protocol, may include but are not limited to cellular communication protocols, such as Long-term Evolution (LTE), a wireless fidelity (Wi-Fi) protocol, a DSRC protocol, IEEE 802.11, 802.11p, 802.15, 802.16, 1609, Worldwide Interoperability for Microwave Access (Wi-MAX), Wireless Access in Vehicular Environments (WAVE), Transmission Control Protocol and Internet Protocol (TCP/IP), User Datagram Protocol (UDP), Hypertext Transfer Protocol (HTTP), ZigBee, EDGE, and/or Bluetooth (BT) communication protocols.

The body control module 214 may refer to another electronic control unit that comprises suitable logic, circuitry, interfaces, and/or code that may be operable to control various electronic components or systems of the vehicle 100, such as a central door locking system. The body control module 214 may be configured to receive a command from the ECU 202 to unlock a vehicle door of the vehicle 100. The body control module 214 may relay the command to other suitable vehicle systems or components, such as the central door locking system for access control of the vehicle 100. The driveline 216 may refer to a power transmission system from an engine to the steering wheel 226 and may be a conventional driveline known in the art. The transmission system 218 may be a part of the driveline 216. The transmission system 218 may refer to a manual transmission, a synchronized transmission, a fully automatic transmission, a semi-Automatic transmission, a Continuously Variable Transmission (CVT), a sequential transmission, dual clutch transmission (DCT), or other transmission known in the art.

The steering system 220 may be configured to receive one or more commands from the ECU 202 and the body control module 214. In accordance with an embodiment, the steering system 220, in association with the electric motor 224 and the steering wheel 226, may automatically control direction of movement of the vehicle 100. Examples of the steering system 220 may include, but are not limited to, a power assisted steering system, a vacuum/hydraulic based steering system, an electro-hydraulic power assisted system (EHPAS), or a "steer-by-wire" system known in the art.

The sensing system 222 may comprise suitable logic, circuitry, and/or interfaces that may be operable to detect first information and/or second information associated with the vehicle 100, by use of one or more sensors. The detection of the first information and/or the second information may be based on an operational mode in which the imaging device 102 is activated. The sensing system 222 may be further operable to transmit the detected first information and/or the second information to the ECU 202. Examples of the sensors used in the sensing system 222 may include, but are not limited to, an accelerometer, a gyro sensor, a proximity sensor, a Global Positioning System (GPS) sensor, the vehicle speed sensor, the odometric sensors, a yaw rate sensor, a steering angle detection sensor, a vehicle travel direction detection sensor, an image sensor, a touch sensor, and/or an infrared sensor.

The vehicle power system 228 may be configured to regulate the charging and power output of the battery 230 to various electric circuits and loads (not shown) of the vehicle 100, as described above. When the vehicle 100 is a hybrid vehicle or an autonomous vehicle, the vehicle power system 228 may be configured to provide the required voltage to all of the components of the vehicle 100. Further, based on the vehicle power system 228, the vehicle 100 may be enabled to utilize the battery power of the battery 230 for a specific amount of time. In accordance with an implementation, the vehicle power system 228 may correspond to a power electronics system, and may include a microcontroller that may be communicatively coupled to the vehicle network 232. In such an implementation, the microcontroller may be configured to receive one or more commands from the driveline 216 under the control of the ECU 202.

The battery 230 may be a source of electric power for one or more electric circuits or loads of the vehicle 100. The battery 230 may be a rechargeable battery. The battery 230 may be a source of electrical power to start an engine of the vehicle 100 by selectively providing electric power to an ignition system (not shown) of the vehicle 100. The loads may include, but are not limited to, various lights (such as headlights and interior cabin lights), electrically powered adjustable components (such as vehicle seats, mirrors, windows or the like), and/or other systems (such as radio, the display device 106a, the audio interface 208, electronic navigation system, electrically controlled, powered and/or assisted steering, such as the steering system 220).

The vehicle network 232 may include a medium through which the various components and systems of the vehicle 100, communicate with each other. The vehicle network 232 may correspond to the vehicle network explained in the FIG. 0.1. Various standard formats may be defined for the interchange of messages between the aforementioned components and systems of the vehicle 100.

In operation, the sensors of the sensing system 222 may be operable to detect first information and/or second information that may correspond to the motion of the vehicle 100 on a road surface. The detected first information may correspond to a rate of deceleration of the vehicle 100 detected by the sensors of the sensing system 222. The detected first information may further correspond to a lateral displacement of the vehicle 100 above a pre-defined distance threshold for a first mode activation. The lateral displacement of the vehicle 100 may be detected based on monitoring of the wheels 210 by the sensors of the sensing system 222. The detected first information may further correspond to a push of a brake pedal of the braking system 206 of the vehicle 100, an activation of a turn signal of the vehicle 100, a presence of another vehicle within a pre-defined proximity range of vehicle 100, a low visibility associated with a view in a frontward direction of vehicle 100 from a driver, a blocking of a frontward view of the vehicle 100 by another vehicle, a reduction in speed of other vehicle to a value below a pre-defined speed threshold for first mode activation, and/or a change in a steering angle of the steering 224 of the vehicle 100, above a pre-defined angle threshold for the first mode activation. In accordance with an embodiment, the speed threshold, distance threshold, and/or angle threshold may be retrieved from the memory 204. In accordance with an embodiment, the detection of the first information based on the above-mentioned change in motion parameters of the other vehicle may be based on the monitoring of the other vehicle by the imaging device 102. The monitoring may be based on radio wave-based object detection and/or laser-based object detection. The monitoring may be further based on a wireless communication established between the vehicle 100 and the detected other vehicle by use of the wireless communication system 212. The wireless communication system 212 may be operable to establish a communicative connection between the vehicle 100 and the detected other vehicle, based on the communication channel 212a.

In accordance with an embodiment, the second information may be detected when a turn is negotiated by the vehicle 100 towards the passenger side. The second information may correspond to one or more actions associated with the vehicle 100. The one or more actions may correspond to turn signal activation and/or a detection of a lane change by the vehicle 100 based on a monitoring of wheels 210 by the sensors of the sensing system 222. The detection of the lane change by the vehicle 100 may be further based on monitoring of the steering wheel 226 by the steering system 220. The one or more actions associated with the vehicle 100 may further correspond to a detection of reduction in speed by the sensing system 222 of the vehicle 100 to a value below a pre-defined speed threshold for the second mode activation. The second information may further correspond to a detection of a change in a steering angle of the steering wheel 226 by the steering system 220 above a pre-defined angle threshold for the second mode activation.

In accordance with an embodiment, the ECU 202 may be operable to utilize the second information, in conjunction with data associated with the map retrieved from the memory 204, to control the imaging device 102. In accordance with an embodiment, the data associated with the retrieved map may correspond to a turn and/or an intersection of a road towards the passenger side of the vehicle 100. In accordance with an embodiment, the ECU 202 may be operable to use the second information, in conjunction with location data of the vehicle 100 detected by the GPS, to control the imaging device 102.

In accordance with an embodiment, the imaging device 102 may be adjustably mounted on or integrated with the rear-view mirror 110a on the driver side 108a and/or the other rear-view mirror 110b on the opposite side 108b, such as the passenger side, of the vehicle 100. In accordance with an embodiment, the imaging device 102 may be mounted on the vehicle body (not shown). In accordance with an embodiment, the imaging device 102 may be integrated in the vehicle body. In accordance with an embodiment, the imaging device 102 may extend outwards from the vehicle 100 and/or retract into the vehicle body automatically or based on the detected first information and/or the detected second information.

In an embodiment, the imaging device 102 may be controlled by the ECU 202 based on one or more instructions received from the user, such as the driver of the vehicle 100. The one or more instructions may be received from the audio interface 208, and/or the display device 106*a*, via the vehicle network 232. The received one or more instructions may correspond to the activation of the imaging device 102 in one of the operational modes. The imaging device 102 may be further operable to capture one or more images and transmit the captured one or more images to the display device 106*a* for display.

In accordance with an embodiment, the vehicle power system 228 may be configured to control the power supply from the battery 230 to the display device 106*a* and/or the audio interface 208. Based on the power supply from the battery 230, the operational state of the display device 106*a* and/or the audio interface 208 may be switched from "ON" to "OFF" state, and vice versa. The display device 106*a* may be operable to receive and output the first information and/or the second information that may correspond to an action manually performed by the user, such as the driver. Such a manually performed user action may comprise selection of one of the set of operational mode buttons 104*c*, the set of voice-based commands provided to the infotainment system 106 via the audio interface 208, and/or a combination of pre-defined gestures performed by the user and detected by the infotainment system 106.

In accordance with an embodiment, based on the detected first information and/or the second information, the ECU 202 may be operable to control the activation of the imaging device 102 in an operational mode, such as a surpass assistance mode or a turn assistance mode. In the surpass assistance mode, the orientation of the imaging device 102 may be in a forward-facing direction. The forward-facing direction may correspond to a direction along the motion of the vehicle 100 on the road. In the turn assistance mode, the orientation of the imaging device 102 may be in a sideward-facing direction. The sideward-facing direction may correspond to a direction inclined at an angle with respect to the motion of the vehicle 100 on the road. In accordance with an embodiment, the imaging device 102 may comprise a plurality of cameras. In the surpass assistance mode, a first camera of the imaging device 102 may be oriented in a forward-facing direction and the second camera of the imaging device 102 may be oriented in a rearward-facing direction. Similarly, in the turn assistance mode, the first camera of the imaging device 102 may be oriented in a sideward-facing orientation and the second camera of the imaging device 102 may be oriented in a rearward-facing orientation.

In accordance with an embodiment, the ECU 202 may be operable to receive one or more of a voice-based command from the audio interface 208 and/or a gesture-based command from the display device 106*a*, provided by the user, via the vehicle network 232. Based on the received commands from the user, the ECU 202 may be operable to control the activation of the imaging device 102 in an operational mode. In accordance with an embodiment, upon activation, the imaging device 102 may be rotated from a rearward-facing orientation to a forward-facing orientation or a sideward-facing orientation. In accordance with an embodiment, when the imaging device 102 comprises a plurality of cameras, the first camera of the imaging device 102 may be rotated to a forward-facing orientation or a sideward-facing orientation, and the second camera of the imaging device 102 may remain in the rearward-facing orientation.

In accordance with an embodiment, the ECU 202 may be operable to predict the operational mode of the imaging device 102. The prediction may be based on a historical record associated with the driving pattern of the vehicle 100, the first information, and/or the second information. For example, based on collation of data that corresponds to a daily movement of the vehicle 100 along a path and the intersections present on the path, the ECU 202 may be operable to predict the activation of the turn-assistance mode.

In accordance with an embodiment, the imaging device 102 may be operable to initiate the capture of one or more images based on control instructions received from the ECU 202. In accordance with an embodiment, the ECU 202 may be operable to retrieve a pre-configured timer value from the memory 204, via the vehicle network 232. The ECU 202 may be further operable to initiate a timer with the pre-configured timer value at the instant when the imaging device 102 starts to capture the one or more images. In accordance with an embodiment, the ECU 202 may be operable to generate a notification that corresponds to the activation of the imaging device 102 in the operational mode. In accordance with an embodiment, the notification may correspond to an icon that may be rendered on the display device 106*a*. The rendered icon may correspond to the activated operational mode. In accordance with an embodiment, the notification may correspond to a haptic feedback provided on the steering wheel 226, and/or a sound played via the audio interface 208.

In accordance with an embodiment, the imaging device 102 may be operable to transmit the captured one or more images to the display device 106*a*, via the vehicle network 232. The display device 106*a* may correspond to a heads-up display (HUD), an augmented reality (AR)-HUD, a driver information console (DIC), a see-through display, and/or a smart-glass display. In accordance with an embodiment, the imaging device 102 may be operable to transmit the captured one or more images to the windshield of the vehicle 100. The windshield may render the received one or more images based on a projecting mechanism. The projecting mechanism may be operable to track the movement of the eyes of a user, such as the driver of the vehicle 100. Based on the tracked eye movement, the projecting mechanism may augment the view of the driver with the captured one or more images.

In accordance with an embodiment, when the imaging device 102 comprises a plurality of cameras, the display device 106*a* may be operable to split the display interface of the display device 106*a* in a plurality of portions that comprise a first portion and/or a second portion. The captured one or more images from the first camera of the imaging device 102 may be rendered at the first portion of the display device 106*a*. The captured one or more images from the second camera of the imaging device 102 may be rendered at the second portion of the display device 106*a*.

In accordance with an embodiment, the ECU 202 may be operable to receive one or more input parameters from the user to control the activated imaging device 102, from the audio interface 208 and/or the display device 106*a*, via the vehicle network 232. In accordance with an embodiment, the one or more input parameters may correspond to a command to perform a zoom-in and/or zoom-out operation on the captured one or more images. In accordance with an embodiment, the one or more input parameters may further correspond to a command to change the resolution of the captured one or more images. In accordance with an embodiment, the one or more input parameters may correspond to a command to adjust a line-of-sight of the activated imaging device 102 with respect to a road surface beneath the vehicle 100. In accordance with an embodiment, the ECU 202 may be operable to dynamically adjust the line-of-sight of the activated imaging device 102 with respect to a road surface beneath the vehicle 100. The adjustment of the line-of-sight of the activated imaging device 102 may be based on one or more road surface characteristics, such as an upward slope, a downward slope, a bank angle, a curvature, a boundary, a speed limit, a road texture, a pothole, and/or a lane marking. Notwithstanding, the disclosure may not be so limited, and the ECU 202 may be operable to adjust other such parameters associated with the captured one or more images, without limiting the scope of the disclosure.

In accordance with an embodiment, the imaging device 102 may be operable to detect one or more objects that may be in motion on the road. The detection of the one or more objects may be based on a radio wave-based object detection device, a laser-based object detection device, and/or a wireless communication device.

In accordance with an embodiment, the ECU 202 may be operable to detect one or more objects from the captured one or more images. In accordance with an embodiment, the ECU 202 may be operable to retrieve an algorithm from the memory 204, for the detection of the one or more objects. The retrieved algorithm may include known in the art algorithms, such as a grayscale matching algorithm, an edge matching algorithm, a gradient matching algorithm, and/or a histogram of receptive field responses, for object detection.

In accordance with an embodiment, the detected one or more other objects may correspond to one or more other vehicles and/or obstacles on the road. The detected one or more vehicles may be present in a pre-defined proximity range of the vehicle 100. The detected obstacles may correspond to one or more of a pavement alongside a road surface on which the vehicle 100 is travelling, an upcoming vehicle alongside a shoulder of the road surface, a curvature of the road surface ahead in a direction of motion of the vehicle 100, a heavy vehicle moving in front of the vehicle 100, a pothole, a speed breaker, a rock, a human subject, and/or a turn towards passenger side of the vehicle 100. Notwithstanding, the disclosure may not be so limited, and the detected one or more objects may include other obstacles apart from those mentioned above, without limiting the scope of the disclosure.

In accordance with an embodiment, based on the detected one or more other vehicles, the ECU 202 may be operable to generate an alert indication along with the rendered one or more images at the display device 106a. The generated alert indication along with the rendered one or more images may be removed from the display device 106a, when the one or more other vehicles is no longer detected by the vehicle infrastructure 100a.

In accordance with an embodiment, when the imaging device 102 is activated in the surpass assistance mode, the ECU 202 may be operable to generate passage information. The generated passage information may indicate availability of a passage to allow the detected one or more other vehicles to be surpassed. In accordance with an embodiment, the ECU 202 may be further operable to communicate the generated passage information to the display device 106a and/or the audio interface 208. In accordance with an embodiment, the display device 106a may be operable to project the generated passage information on a smart windshield of the vehicle 100. The display device 106a may be operable to display an alert indication that may comprise an icon to indicate the availability of the safe passage. In accordance with an embodiment the display device 106a may be operable to render the icon at the display device 106a. In accordance with an embodiment, the icon may be displayed at the electronic instrument cluster 104a. In accordance with an embodiment, the audio interface 208 may be operable to indicate availability of the safe passage based on a speaker, chime, buzzer, or other device to generate sound. In accordance with an embodiment, the ECU 202 may be operable to indicate availability of the safe passage based on haptic feedback provided on the steering wheel 226.

In accordance with an embodiment, when the imaging device 102 is activated in the turn assistance mode, the ECU 202 may be operable to generate obstacle information. The generated obstacle information may indicate the presence of one or more objects at a turn or an intersection (towards the passenger side) that may be negotiated by the vehicle 100. In accordance with an embodiment, the ECU 202 may be further operable to communicate the obstacle information to the display device 106a and/or the audio interface 208. In accordance with an embodiment, the display device 106a may be operable to display an alert indication that may comprise an icon that indicates the presence of the detected one or more objects at the turn or the intersection. In accordance with an embodiment, the audio interface 208 may be operable to indicate the presence of the detected one or more objects at the turn or the intersection based on a speaker, chime, buzzer, or other device and generate a sound. In accordance with an embodiment, the display device 106a may be operable to display the icon at one of the electronic instrument cluster 104a. In accordance with an embodiment, the display device 106a may be operable to indicate the presence of the detected one or more objects at the turn, based on haptic feedback rendered at the steering wheel 226.

In accordance with an embodiment, based on the detection of the one or more objects, the ECU 202 may be operable to determine a responsive action to be performed. The responsive action to be performed may be based on the operational mode in which the imaging device 102 is activated. In accordance with an embodiment, the responsive action may correspond to automatic change of speed of the vehicle 100 to a value below a pre-defined threshold speed value retrieved from the memory 204. Such an automatic change in speed may be performed based on the driveline 216 and/or transmission system 218. The driveline 216 may be operable to perform a damping of the power transmitted by the transmission system 218, from the engine to the steering wheel 226. In accordance with an embodiment, the responsive action may correspond to automatic application of emergency brakes of the braking system 206, based on the detected one or more objects. In accordance with an embodiment, the responsive action may correspond to automatic honking and/or activation of an alarm associated with the body control module 214 of the vehicle 100, as an alert.

In accordance with an embodiment, the ECU 202 may be operable to deactivate the activated imaging device 102 in one of the operational modes, based on the detection of one or more other actions associated with the vehicle 100. Such one or more other actions may be manually performed by the user, such as the driver of the vehicle 100. The one or more other actions may be complimentary to the one or more actions performed for the activation of the imaging device 102. The one or more other actions may correspond to deactivation of a turn signal, a selection of the set of operational mode buttons 104c, a set of voice-based commands provided to the infotainment system 106 via the audio interface 208, and/or a combination of pre-defined gestures provided to the infotainment system 106, via the display device 106a.

In accordance with an embodiment, the deactivation may be based on detection of an absence of one or more other vehicles from the captured one or more images, by the ECU 202. In accordance with an embodiment, the deactivation may be based on detection of an acceleration of the vehicle 100 above a pre-defined speed threshold for a mode deactivation, by the sensing system 222. In accordance with an embodiment, the deactivation may be based on detection of a lateral displacement of the vehicle 100 below a pre-defined distance threshold for mode deactivation, by sensing system 222. Such a lateral displacement may be based on a monitoring of the wheels 210, by the sensing system 222. In accordance with an embodiment, the deactivation may be based on detection of a change in a steering angle of the steering wheel 226 to a value below an angle threshold for mode deactivation and/or a detection of a completion of a turning action of the vehicle 100 at a turn or an intersection.

In accordance with an embodiment, the ECU 202 may be operable to automatically deactivate the activated imaging device 102 when duration of the initiated timer exceeds a pre-defined period of time. Such a pre-defined period of time associated with the timer may be pre-set by the user, such as the driver. In accordance with an embodiment, upon deactivation, the imaging device 102 of the vehicle 100 may be rotated back to a rearward-facing orientation from a forward-facing orientation or a sideward-facing orientation. In accordance with an embodiment, when the imaging device 102 comprises a plurality of cameras, the first camera of the imaging device 102 may be rotated to back to the rearward-facing orientation when the operational mode is deactivated. In accordance with an embodiment, when the imaging device 102 comprises a plurality of cameras, the first camera of the imaging device 102 may be switched off when the operational mode is deactivated.

FIGS. 3A to 3I are diagrams that illustrate exemplary scenarios that demonstrate driving assistance, in accordance with an embodiment of the disclosure. FIGS. 3A to 3I are explained in conjunction with elements from FIG. 1 and FIG. 2.

Figure 3A:
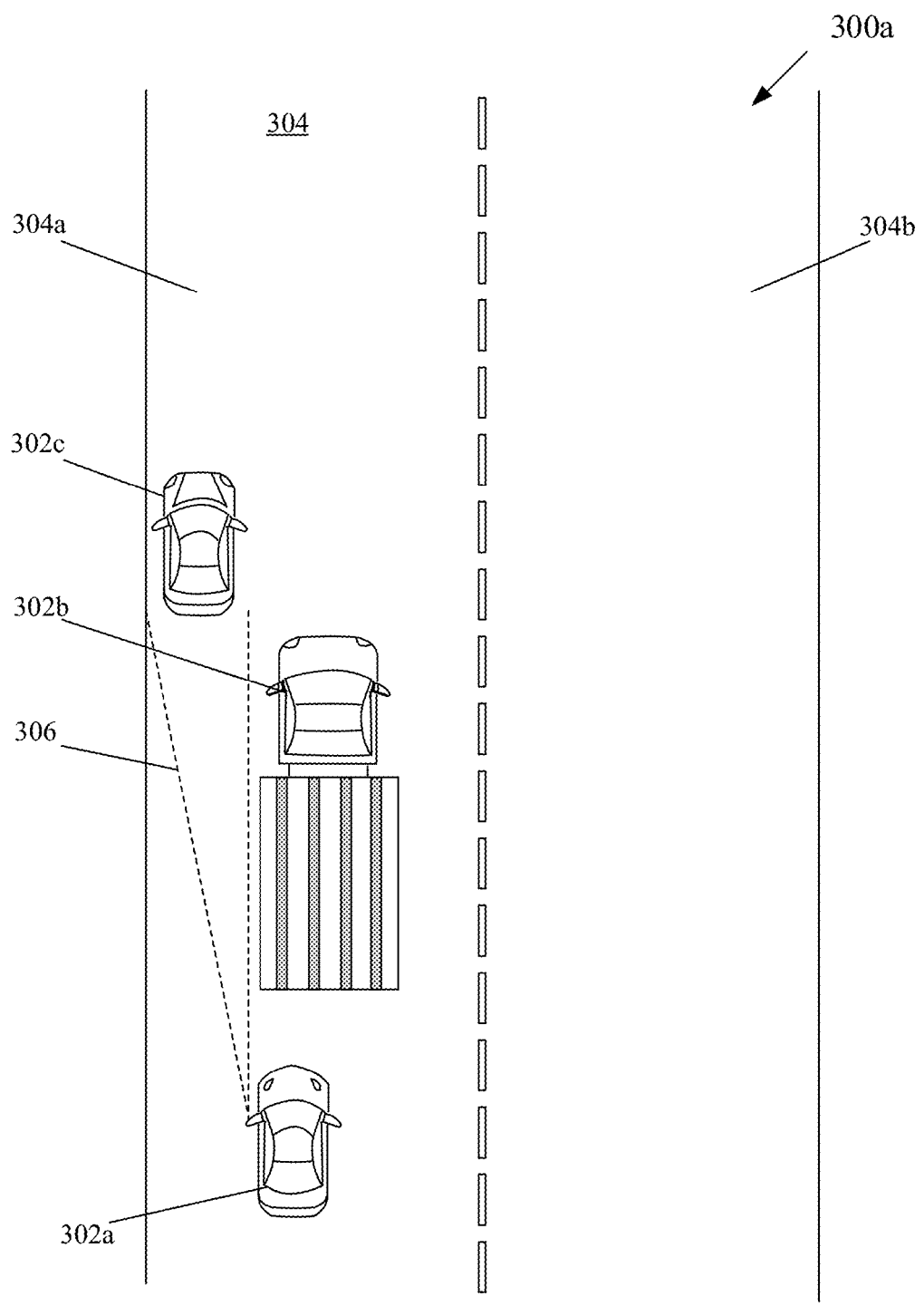
FIGS. 3A to 3I are diagrams that illustrate exemplary scenarios that demonstrate driving assistance, in accordance with an embodiment of the disclosure.

With reference to FIG. 3A, a top view of a first exemplary scenario 300a is illustrated. There is shown a top view of a vehicle 302a that may be in motion on a first exemplary road 304. There are further shown top views of vehicles 302b and 302c, which are moving ahead of the vehicle 302a on the first exemplary road 304. The first exemplary road 304 may comprise two lanes, such as a first lane 304a and a second lane 304b. The vehicles 302a, 302b, and 302c may be in motion on the first exemplary road 304 along the first lane 304a. The vehicle infrastructure of the vehicle 302a may be similar to the vehicle infrastructure 100a of the vehicle 100 described in details in FIG. 1. Further, components, such as an ECU, sensing devices, memory, imaging device, and I/O device, of the vehicle infrastructure of the vehicle 302a may be similar to the components, such as the ECU 202, the memory 204, the imaging device 102, the display device 106a, and the sensing system 222 of the vehicle infrastructure 100a of the vehicle 100 (FIG. 2), respectively.

In accordance with the first exemplary scenario 300a, the vehicle 302b may be detected within a pre-defined proximity range ahead of the vehicle 302a. The sensors of the sensing system 222 in the vehicle 302a may be operable to detect first information based on at least one of or a combination of a deceleration of the vehicle 302a, a lateral displacement of the vehicle 302a, push of brake pedal of the vehicle 302a, activation of a turn signal of the vehicle 302a, and/or a change in a steering angle of the vehicle 302a above an angle threshold for first mode activation. The detected first information may be further based on detection of the vehicle 302b within a pre-defined proximity range of the vehicle 302a. The detected first information may be further based on a type of the detected vehicle 302b, such as a truck. The detected first information may be further based on detection of low visibility in the frontward direction of the vehicle 302a. The detected low visibility may correspond to blocking of the front view of vehicle 302a by the vehicle 302b. The detected first information may be further based on detection of low visibility in the frontward direction from a driver of the vehicle 302a. The sensors, such as cameras, of the sensing system 222 in the vehicle 302a may determine a specific area of an image of the frontward direction as an area where the driver can see in the frontward direction. In instances when the vehicle 302b occupies more than the predetermined portion of the specific area, the low visibility in the frontward direction from the driver may be detected. The detected first information may be further based on detection of speed of the 302b below a pre-defined speed threshold for the one or more vehicles other than the vehicle 302a. In accordance with an instance of the first exemplary scenario, the above illustrated information of the vehicle 302b may be received by the vehicle 302a, from the vehicle 302a, via the wireless communication system 212, based on the established communication channel 212a. The detected first information may indicate an undertake action to be performed by the driver of the vehicle 302a, to surpass the vehicle 302b in the first lane 304a.

In accordance with the first exemplary scenario 300a, it may be assumed that an overtake action of the vehicle 302a across the vehicle 302b may not be allowed as such an overtake action may lead the vehicle 302a to enter the second lane 304b. In accordance with an instance of the first exemplary scenario 300a, an overtake action of the vehicle 302a across the vehicle 302b may not be allowed as such an overtake action may lead to collision of the vehicle 302a with the vehicle 302c that may be ahead of the vehicle 302b. Based on the detected first information, the ECU 202 of the vehicle infrastructure of the vehicle 302a may be operable to activate the imaging device 102 in the vehicle 302a in a surpass assistance mode. The details of the activation of the imaging device 102 are explained in FIGS. 3C, 3D, and 3E. The activated imaging device 102 may be operable to capture one or more images that correspond to the portion 306 of the first exemplary road 304 towards the passenger side, ahead of the vehicle 302a. The captured one or more images may be displayed on the display screen of the vehicle 302a, explained in detail in FIGS. 3F and 3G.

In accordance with an instance of the first exemplary scenario 300a, the ECU in the vehicle 302a may be operable to determine non-availability of a safe passage to allow the vehicle 302b to be surpassed. The non-availability of the safe passage may be determined when one or more vehicles, such as the vehicle 302c, are detected (in the portion 306) by the vehicle infrastructure of the vehicle 302a. Based on the non-availability of the safe passage to surpass the vehicle 302b, the vehicle infrastructure of the vehicle 302a may generate an indication of non-availability of the safe passage. Such indication may be rendered on an electronic instrument cluster, via an icon, or haptic feedback on the vehicle steering wheel of the vehicle 302a. The indication may also be rendered on the display screen of the vehicle 302a.

In accordance with another instance of the first exemplary scenario 300a, the vehicle 302c is not present ahead of the vehicle 302b in the portion 306 captured by the imaging device of the vehicle 302a, and a passage may be available for the vehicle 302a to undertake the vehicle 302b. In such an instance, the vehicle infrastructure of the vehicle 302a may indicate availability of a passage to allow for such an undertake action. Such an indication may be rendered at the electronic instrument cluster 104a, via the icon, or haptic feedback on the steering 104b. The indication may also be rendered on the display device 106a of the vehicle 302a.

Figure 3B:
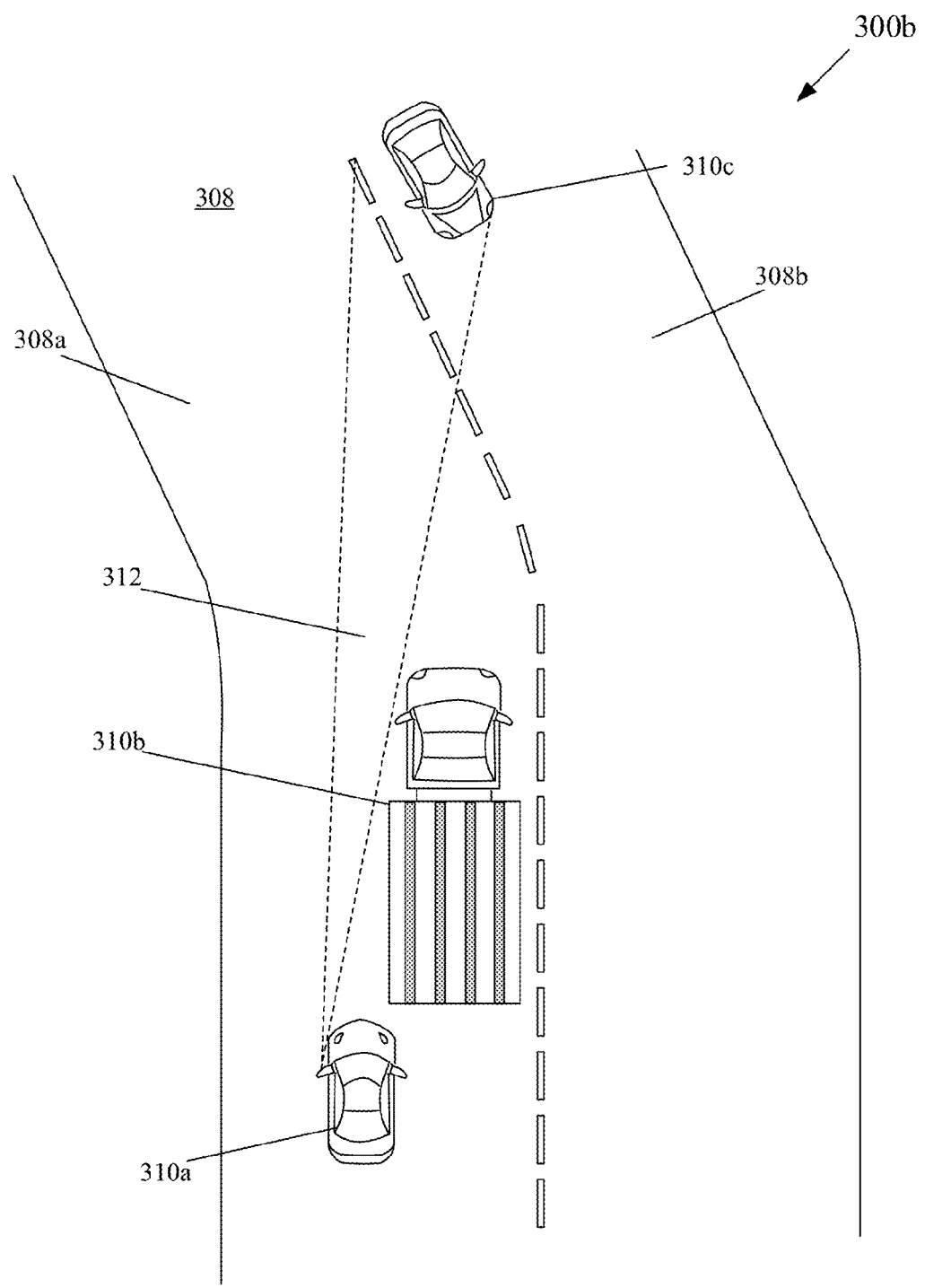

With reference to FIG. 3B, a top view of a second exemplary scenario 300b is illustrated. There is shown a top view of the second exemplary road 308 that may comprise two lanes, such as a first lane 308a and a second lane 308b. The second exemplary road 308 may comprise a gradual curvature towards the first lane 308a. There are further shown top views of vehicles 310a and 310b that may be in motion on the first lane 308a, such that the vehicle 310b is ahead of the vehicle 310a. Further, a vehicle 310c may be in motion towards the vehicles 310a and 310b on the second lane 308b. The vehicle infrastructure of the vehicle 310a may be similar to the vehicle infrastructure 100a of the vehicle 100 described in detail in FIG. 1. Further, components, such as an ECU, sensing devices, memory, imaging device, and I/O device, of the vehicle infrastructure of the vehicle 310a may be similar to the components, such as the ECU 202, the memory 204, the imaging device 102, the display device 106a, and the sensing system 222 of the vehicle infrastructure 100a of the vehicle 100 (FIG. 1), respectively.

In accordance with the second exemplary scenario 300b, the sensing devices in the vehicle 310a may be operable to detect first information that may indicate an overtake action to be performed by the driver of the vehicle 310a, to surpass the vehicle 310b. The overtake action may correspond to an action to surpass the vehicle 310b via the second lane 308b. In such a scenario, the driver of the vehicle 310a may require a captured image of the portion 312 of the second exemplary road 308 ahead that may not be accessible to the driver from the driver-side of the vehicle 310a, due to the gradual curvature. In such a scenario, based on the detected first information, the vehicle infrastructure of the vehicle 310a may be operable to activate the imaging device of the vehicle 310a in a surpass assistance mode, as explained in detail in FIGS. 3C, 3D, and 3E. The activated imaging device may be operable to capture one or more images that correspond to a portion 312 of the second exemplary road 308 towards the passenger side. The captured one or more images may be displayed on the display screen of the vehicle 310a, explained in detail in FIGS. 3F and 3G.

In an instance, when the oncoming vehicle 310c is detected in the portion 312 of the second exemplary road 308, the vehicle infrastructure of the vehicle 310a may be operable to generate a notification to alert the user to not overtake the vehicle 310b. In another instance, when the oncoming vehicle 310c in the second lane 308b is not moving towards the vehicles 310a and 310b, the vehicle infrastructure of the vehicle 310a may be operable to generate another notification. Such a notification may notify the driver of the vehicle 310a of an availability of a passage to overtake the vehicle 310b from the second lane 308b.

Figure 3C:
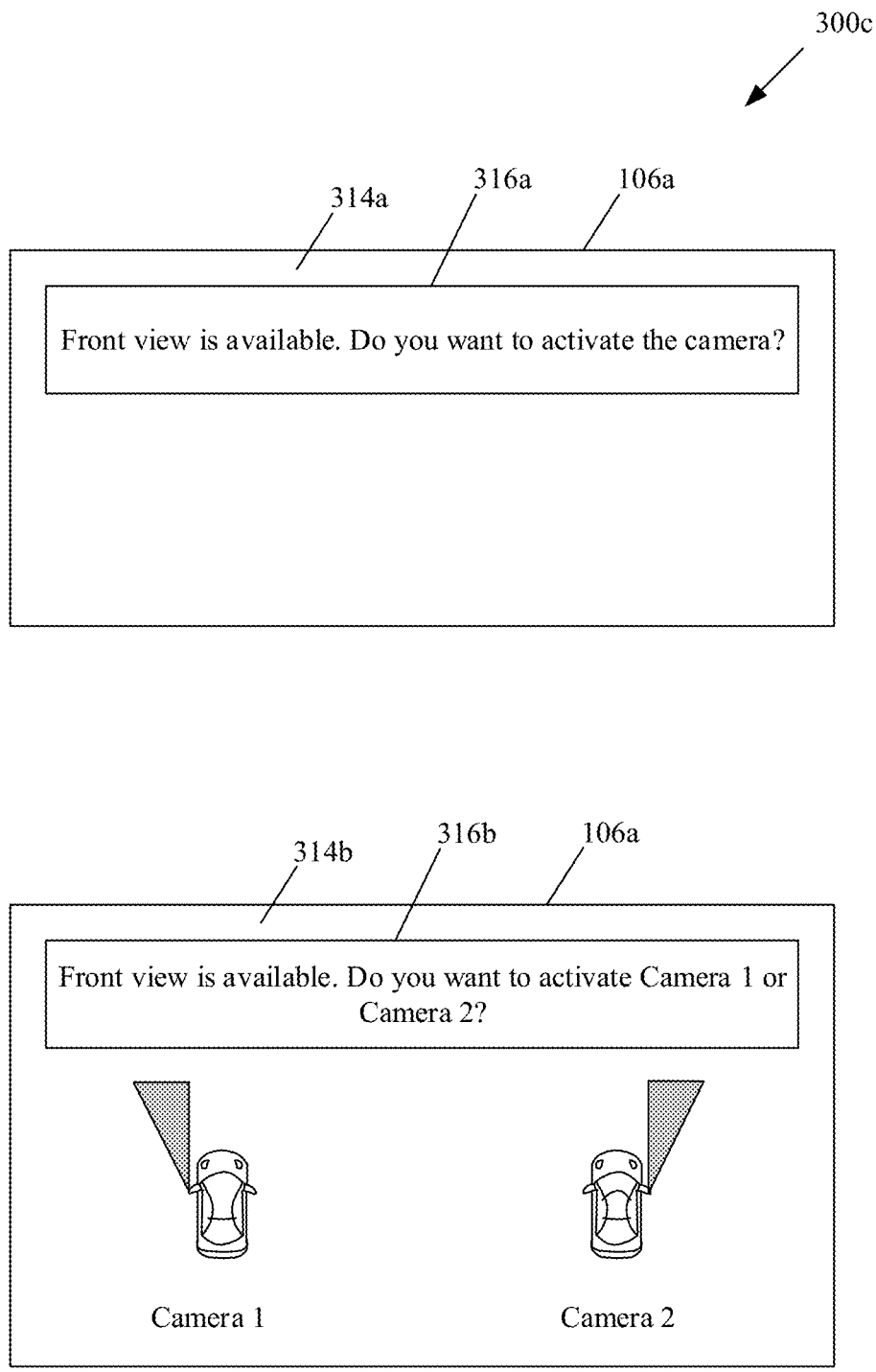

With reference to FIG. 3C, exemplary user interfaces 300c are illustrated. The exemplary user interfaces 300c may correspond to display screens 314a and 314b of the display device 106a of the vehicle 302a. The display screens 314a and 314b may correspond to user interfaces for activation of the imaging device 102 based on the detected first information and/or the second information (explained in detail in FIG. 1).

In accordance with a first example of the exemplary user interfaces 300c, the vehicle 302a may comprise the imaging device 102 comprising a single camera that may be mounted or integrated on the rear-view mirror 110b on the passenger side 108b or the rear-view mirror 110a on the driver side 108a. In an instance, the imaging device 102 may be mounted on the external body of the vehicle 302a. The imaging device 102 may be integrated in the external body of the vehicle 302a. The imaging device 102 may extend outwards from the vehicle and/or retract into the body of the vehicle 302a automatically or based on press of the set of operational mode buttons 104c. The automatic activation of the imaging device 102 in an operational mode may be based detected on one or more actions. In such an example, the display screen 314a may be rendered on the display device 106a, based on the detection of the first information and/or the second information. The display screen 314a may comprise a first user interface element 316a. The first user interface element 316a may correspond to a notification for the user of the vehicle 302a. The notification may be generated based on the detection of the first information and/or the second information. Based on the notification, the display device 106a may be operable to receive one or more user inputs to activate the imaging device 102. The notification may comprise an exemplary character string, such as "Front view is available. Do you want to activate the camera?"

In accordance with a second example of the exemplary user interfaces 300c, the vehicle 302a may comprise the imaging device 102. The imaging device may comprise a plurality of cameras, such as "Camera 1" and "Camera 2" that may be mounted or integrated on different parts, such as the rear-view mirror 110a on the driver side 108a or the other rear-view mirror 110b on the opposite side 108b, of the vehicle 302a, respectively. In such an example, the display screen 314b may be rendered at the display device 106a, based on the detection of the first information and/or the second information. The display screen 314b may comprise a second user interface element 316b. The second user interface element 316b may correspond to a notification to a selection from the plurality of cameras, for activation. The notification may comprise an exemplary character string, such as "Front view is available. Do you want to activate Camera 1 or Camera 2?"

Figure 3D:
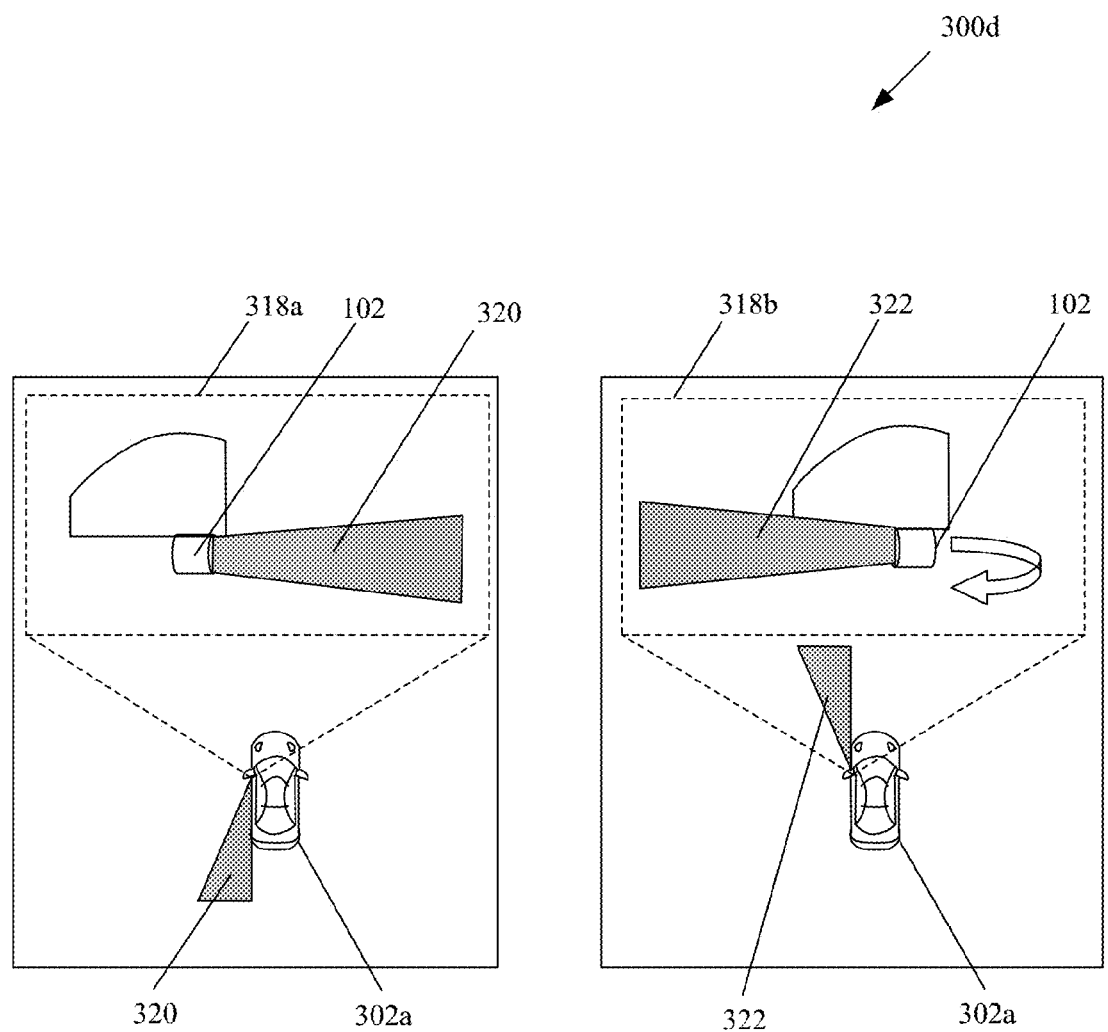

With reference to FIG. 3D, exemplary orientations 300d of the imaging device 102 are illustrated. The exemplary orientations 300d may correspond to a first orientation 318a and a second orientation 318b of the imaging device 102 mounted on the ORVM of the vehicle 302a. The first orientation 318a may correspond to the orientation of the imaging device 102 before activation. The second orientation 318b may correspond to the orientation of the imaging device 102 after activation.

With reference to the first orientation 318a, the imaging device 102 may be operable to capture one or more images in the rearward-facing direction of the vehicle 302a. The captured one or more images may correspond to the portion 320 in the rearward-facing direction with respect to the motion of the vehicle 302a. With reference to the second orientation 318b, the imaging device 102 may be operable to capture one or more images in the forward-facing direction of the vehicle 302a. The captured one or more images may now correspond to the portion 322 in the forward-facing direction with respect to the motion of the vehicle 302a.

Figure 3E:
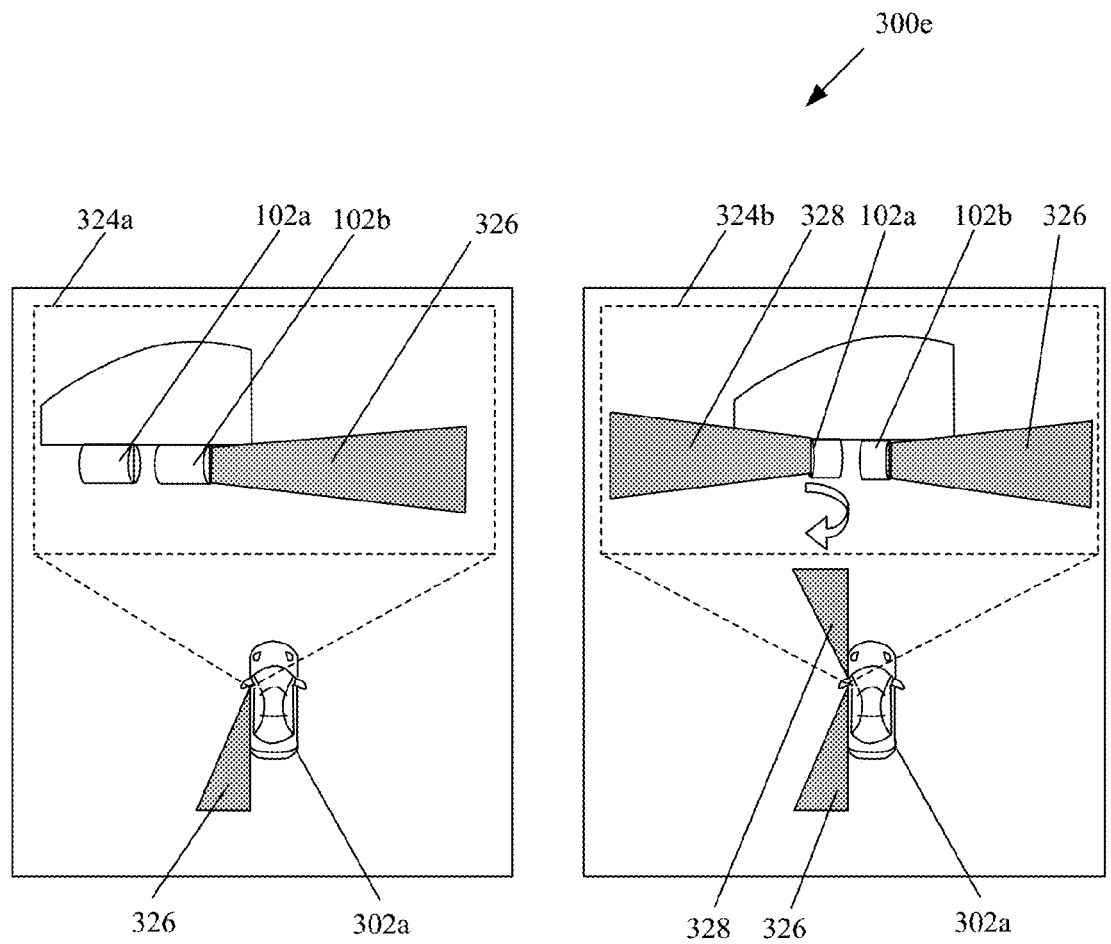

With reference to FIG. 3E, exemplary orientations 300e of the imaging device 102 are illustrated. The exemplary orientations 300e may correspond to scenarios when the imaging device 102 comprises multiple instances of the imaging device 102, such as a first imaging device 102a and a second imaging device 102b. The exemplary orientations 300e may further correspond to a first orientation 324a and a second orientation 324b of the first imaging device 102a and second imaging device 102b. The first orientation 324a may correspond to the orientation of the first imaging device 102a and second imaging device 102b before activation. The second orientation 324b may correspond to the orientation of the first imaging device 102a and second imaging device 102b after activation.

With reference to the first orientation 324a, the first imaging device 102a and second imaging device 102b may be operable to capture one or more images in the rearward-facing direction of the vehicle 302a. The captured one or more images may correspond to the portion 326 in the rearward-facing direction with respect to the motion of the vehicle 302a. With reference to the second orientation 324b, the first imaging device 102a may be operable to be rotated to capture one or more images in the forward-facing direction of the vehicle 302a. The one or more images captured by the first imaging device 102a may now correspond to the portion 328 in the forward-facing direction with respect to the motion of the vehicle 302a. The one or more images captured by the second imaging device 102b may correspond to the same portion 326 in the rearward-facing direction with respect to the motion of the vehicle 302a.

Figure 3F:
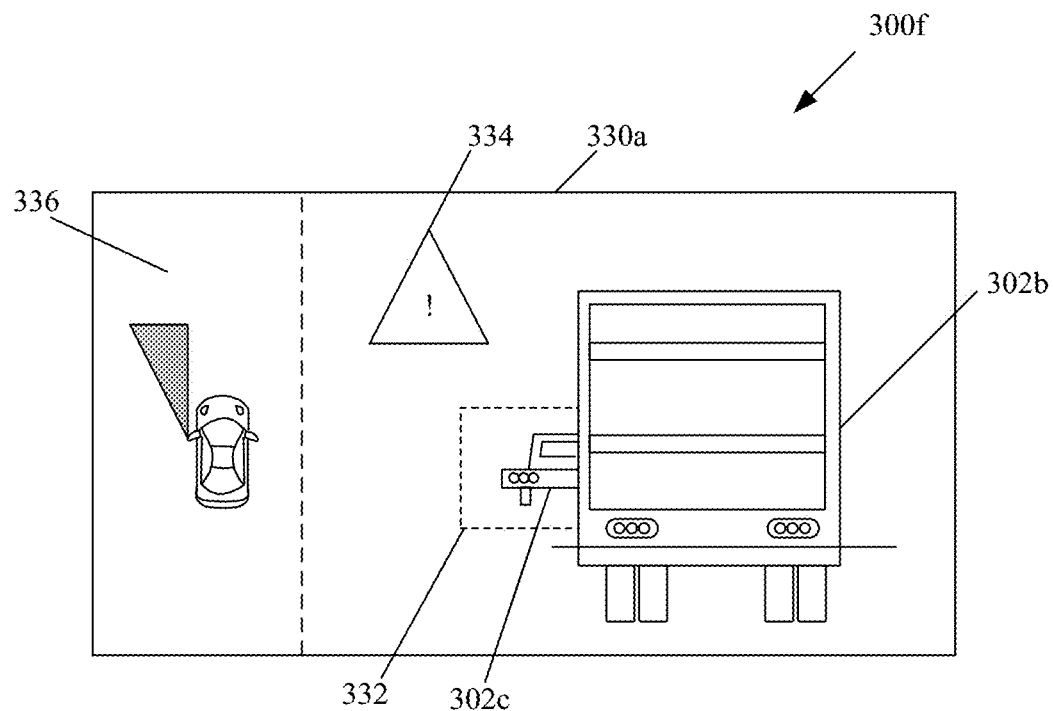
Figure 3F:
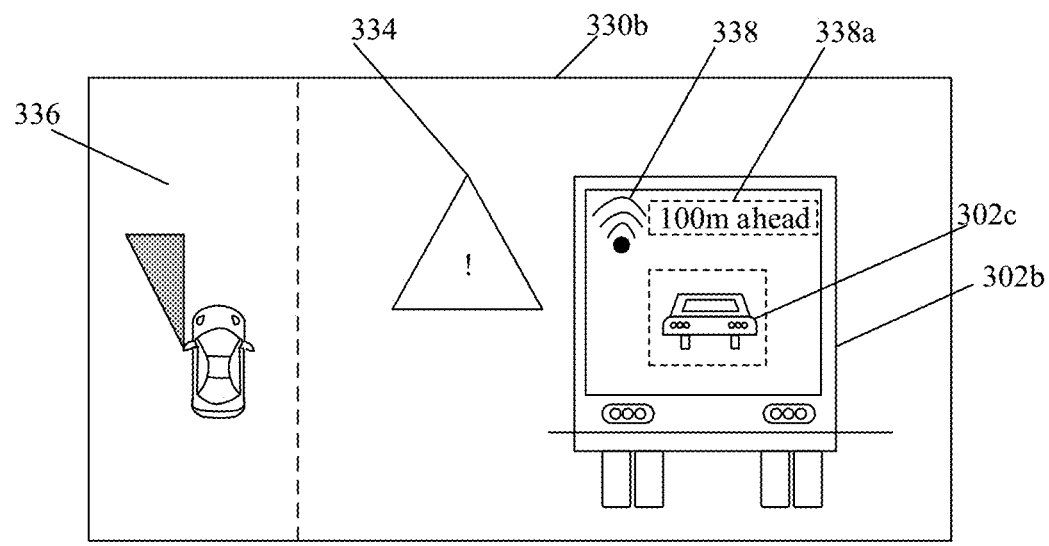

With reference to FIG. 3F, exemplary user interfaces 300f at different display screens of the imaging device 102 are illustrated. The exemplary user interfaces 300f may correspond to a first display screen 330a and a second display screen 330b, of the display device 106a. The first display screen 330a and the second display screen 330b may correspond to the orientations of the imaging device 102 described in FIG. 3D.

The first display screen 330a may correspond to one or more images captured by the imaging device 102 in the frontward direction of the vehicle 302a. The display device 106a may be operable to render the captured one or more images that correspond to the portion 306 of the first exemplary road 304, on the first display screen 330a. The rendered one or more images may comprise the detected vehicle 302b and at least a portion of the vehicle 302c that may be ahead of the vehicle 302b. The presence of the vehicle 302c may be highlighted by the bounding box 332. The non-availability of a safe passage to surpass the vehicle 302b, either by undertaking (as explained in FIG. 3A), or by overtaking (as explained in FIG. 3B), may be indicated by means of an alert indication 334. The alert indication 334 may correspond to a user interface element that may be placed in the proximity of the displayed images of the vehicles 302b and 302c. The first display screen 330a may further comprise a portion 336 to indicate a graphical representation of the orientation of the activated imaging device 102 of the vehicle 302a. For example, the orientation of the imaging device 102 in the first display screen corresponds to the second orientation 318b of the imaging device 102, as explained in FIG. 3D.

The second display screen 330b may correspond to one or more images captured by the imaging device 102 when the presence of the vehicle 302c is detected but the images of the vehicle 302c are not captured. The presence of the vehicle 302c that may be in motion ahead of the vehicle 302b may be detected based on a radio wave-based object detection device, and/or a laser-based object detection device.

In accordance with an exemplary scenario, the presence of the vehicle 302c may be detected based on a communication channel 212a established between the vehicle 302a and the vehicle 302c. Such a communication channel 212a may be established based on the wireless communication system 212 present in the vehicle 302a and the vehicle 302c.

In accordance with another exemplary scenario, the display device 106a may be operable to indicate the presence of the vehicle 302c based on a bounding box 332 that may be superimposed on the rendered image of the vehicle 302b, at the second display screen 330b. The display device 106a may be further operable to indicate the presence of the communication channel 212a based on a user interface element 338. Distance between the vehicle 302c and the vehicle 302a may be represented via an exemplary alpha-numeric character string, such as "100 m ahead". Further, the non-availability of a safe passage to surpass the vehicle 302b may be indicated by means of the alert indication 334. The display device 106a may be further operable to indicate the orientation of the activated imaging device 102 in the portion 336 of the second display screen 330b.

Figure 3G:
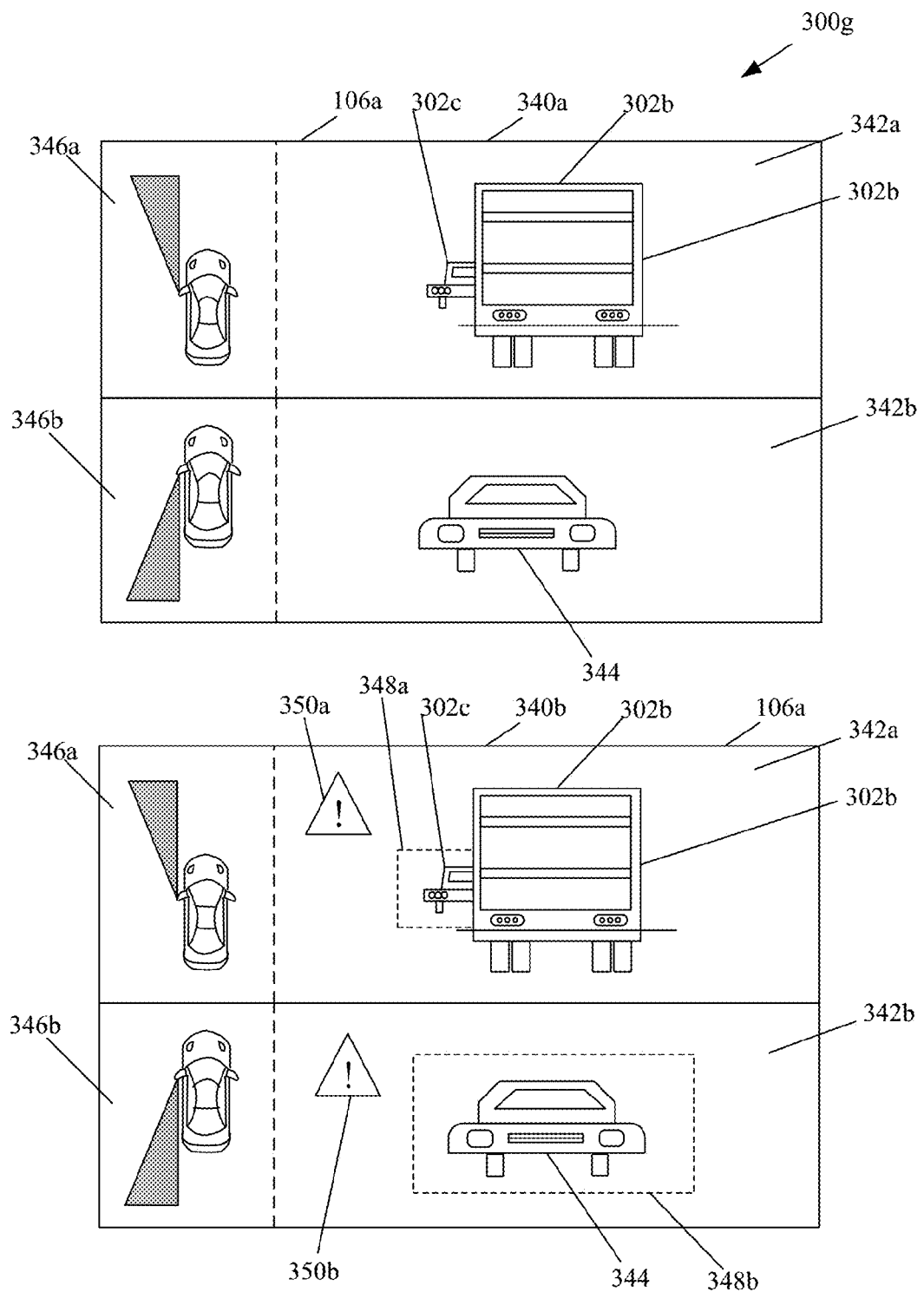

With reference to FIG. 3G, exemplary user interfaces 300g of the imaging device 102 are illustrated. The exemplary user interfaces 300g may comprise a first display screen 340a and a second display screen 340b of the display device 106a. The first display screen 340a and the second display screen 340b may correspond to the orientations of the imaging device 102 described in FIG. 3E.

The first display screen 340a may comprise one or more images captured by the first imaging device 102a and the second imaging device 102b. The display device 106a may be operable to divide the first display screen 340a into a plurality of regions to render the one or more images captured by the first imaging device 102a and the second imaging device 102b. The plurality of regions may comprise a first region 342a and a second region 342b. The captured one or more images associated with the first imaging device 102a correspond to the portion 328 of the first exemplary road 304 in the forward-facing direction with respect to the motion of the vehicle 302a. The one or more images captured by the first imaging device 102a may be rendered in the first region 342a. The one or more images captured by the second imaging device 102b, correspond to the portion 326 of the first exemplary road 304 in the rearward-facing direction with respect to the motion of the vehicle 302a. The one or more images captured by the second imaging device 102b may be rendered in the second region 342b.

The rendered one or more images captured by the first imaging device 102a may comprise the detected vehicle 302b and at least a portion of the vehicle 302c that may be ahead of the vehicle 302b. Similarly, the rendered one or more images captured by the second imaging device 102b may comprise a detected vehicle 344 that may be in motion towards the vehicle 302a from the rear end of the vehicle 302a.

The first region 342a may further comprise a portion 346a that indicates a graphical representation of the orientation of the activated first imaging device 102a in the forward-facing direction with respect to the motion of the vehicle 302a, as explained in FIG. 3E. Similarly, the second region 342b may comprise a portion 346b that indicate another graphical representation of the orientation of the activated second imaging device 102b in the forward-facing direction with respect to the motion of the vehicle 302a, as explained in FIG. 3E.

The second display screen 340b may comprise the elements, as displayed in the first display screen 340a. In addition to the elements described in the first display screen 340a, the second display screen 340b comprises a first bounding box 348a to highlight the presence of the detected vehicle 302c that may be moving ahead of the vehicle 302b. The first region 342a of the second display screen 340b may further comprise an alert indication 350a to indicate the non-availability of a safe passage to surpass the vehicle 302b, either by undertaking (as explained in FIG. 3A), or by overtaking (as explained in FIG. 3B). The alert indication 350a may correspond to a user interface element that may be placed in the proximity of the displayed images of the vehicles 302b and 302c.

The second region 342b of the second display screen 340b may comprise a second bounding box 348b to highlight the presence of the detected vehicle 344 that may be in motion towards the vehicle 302a from the rear end of the vehicle 302a. The second region 342b of the second display screen 340b may further comprise an alert indication 350b to indicate the non-availability of a safe passage to surpass the vehicle 302b due to the presence of detected vehicle 344, either by undertaking (as explained in FIG. 3A), or by overtaking (as explained in FIG. 3B). The alert indication 350b may correspond to a user interface element that may be placed in the proximity of the displayed images of the detected vehicle 344.

Figure 3H:
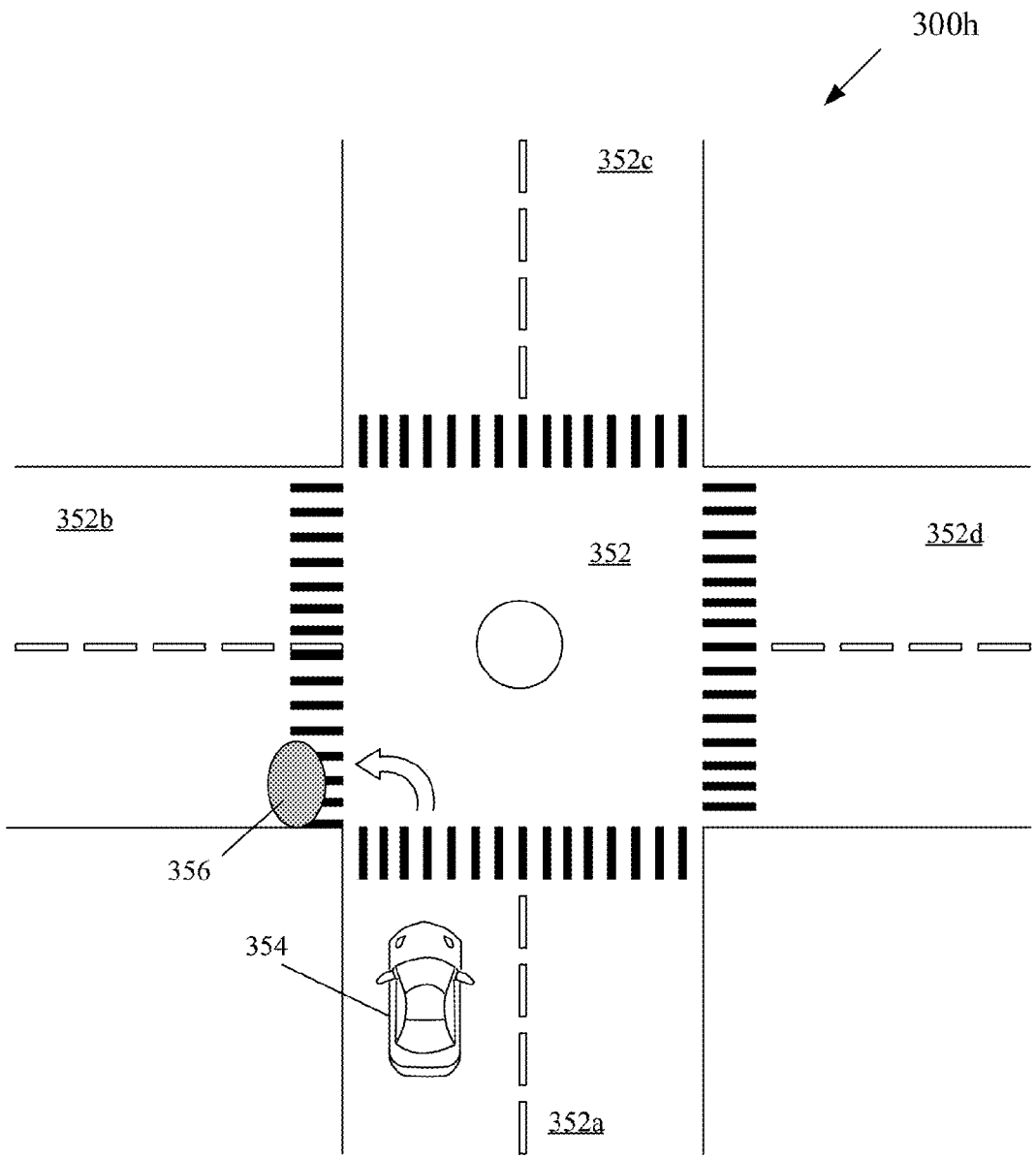

With reference to FIG. 3H, a top view of a third exemplary scenario 300h is illustrated, in accordance with an embodiment of the disclosure. The third exemplary scenario 300h illustrates crossroads 352 that may comprise an intersection of road segments 352a, 352b, 352c, and 352d. There is further shown a vehicle 354 in motion on the road segment 352a of the crossroads 352. Further, the road segment 352b of the crossroads 352 may comprise an obstacle 356, such as a pothole. The vehicle infrastructure of the vehicle 354 may be similar to the vehicle infrastructure 100a of the vehicle 100 described in detail in FIG. 1. Further, components, such as an ECU, sensing devices, memory, imaging device, and I/O device, of the vehicle infrastructure of the vehicle 354 may be similar to the components, such as the ECU 202, the memory 204, the imaging device 102, the display device 106a, and the sensing system 222 of the vehicle infrastructure 100a of the vehicle 100 (FIG. 1), respectively.

In accordance with the third exemplary scenario 300h, the sensing system 222 in the vehicle 354 may be operable to detect second information. The second information may correspond to one or more of a turn signal activated in the vehicle 354, detection of a lane change by the vehicle 354 to take a turn, detection of an intersection in a direction of motion the vehicle 354, and/or detection of a traffic signal at the intersection of the road segments 352a, 352b, 352c, and 352d. The second information may correspond to detection of a turn at an intersection on an upcoming driving route set in a navigation application. The second information may further correspond to one or more of a deceleration of the vehicle 354, detection of slow speed of the vehicle 354 below pre-determined speed threshold for turn assistance mode activation, detection of a steering angle more than pre-determined angle threshold for turn assistance mode activation, and/or a change in a steering angle of the vehicle 354. Based on the detected second information, the vehicle infrastructure of the vehicle 354 may be operable to activate the imaging device of the vehicle 354 in the turn assistance mode.

In accordance with the third exemplary scenario 300h, when the ECU 202 detects the second information, the ECU 202 may be operable to activate the imaging device 102. The ECU 202 may be further operable to adjust the orientation of the imaging device 102, explained in detail in FIG. 3I. The activated imaging device 102 may be operable to capture one or more images in a sideward-facing direction and/or downward-facing direction, towards the passenger side of the vehicle 354. Such captured one or more images may correspond to a pavement, pedestrian, cyclist or other obstacles. The imaging device 102 may be further operable to display the captured one or more images on the display screen of the vehicle 354.

In accordance with the third exemplary scenario 300h, the vehicle 354 may approach the intersection from the road segment 352a in order to negotiate a turn towards the road segment 352b of the crossroads 352. In an instance, a life-form object may cross the road segment 352b while the vehicle 354 negotiates the turn. In another instance, the obstacle 356 may be present near the turn. However, the driver of the vehicle 354 may not be aware of the presence of the life-form object and/or the obstacle 356, due to the blind spot towards the passenger side. In such an instance, based on the detection of presence of the life-form object and/or the obstacle 356, an alert indication that comprises a notification may be generated by the vehicle infrastructure of the vehicle 354. The generated notification may be rendered on the electronic instrument cluster of the vehicle 354 via an icon, or as haptic feedback on the vehicle steering wheel of the vehicle 354. The generated passage information may also be rendered on the display screen of the vehicle 354.

In accordance with the third exemplary scenario 300h, based on the detection of the presence of the life-form object and/or the obstacle 356, an action may be generated by the vehicle infrastructure of the vehicle 354. The generated action may correspond to a rate of change of speed of the vehicle 354 to a value below a pre-defined speed threshold. The action may further correspond to automatic application of emergency brakes or honking of the vehicle 354 based on the detected obstacle 356. Such an action may be performed based on the damping of the power transmitted by the transmission system 218 to the wheels 210, at the driveline 216.

Figure 3I:
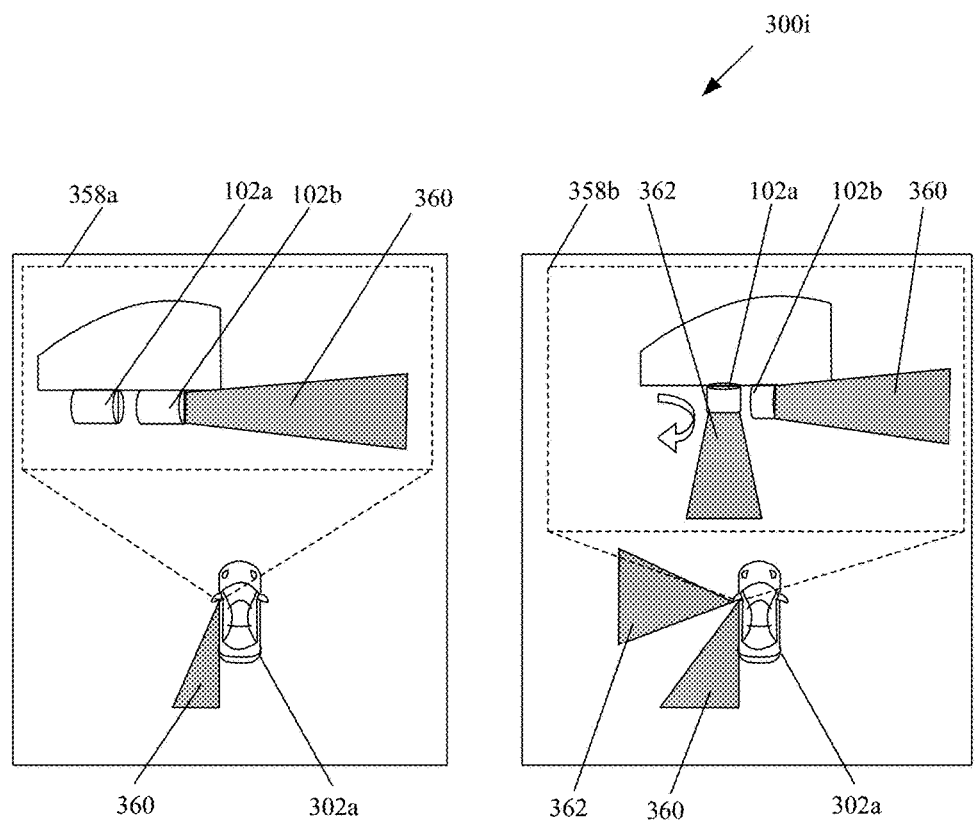

With reference to FIG. 3I, exemplary orientations 300i are illustrated in conjunction with the FIG. 3H. The exemplary orientations 300i may correspond to a scenario when the second information is detected by the sensing system 222 of the vehicle 354. The imaging device 102 comprises multiple instances of the imaging device 102, such as a first imaging device 102a and a second imaging device 102b. Based on the detection of the second information, the first imaging device 102a and the second imaging device 102b may be activated in the turn assistance mode, as explained in the FIG. 3H.

The exemplary orientations 300i may comprise a first orientation 358a and a second orientation 358b of the first imaging device 102a and the second imaging device 102b. The first orientation 358a may correspond to the orientation of the first imaging device 102a and second imaging device 102b before activation in the turn assistance mode. The second orientation 358b may correspond to the orientation of the first imaging device 102a and second imaging device 102b after activation in the turn assistance mode.

With reference to the first orientation 358a, the turn assistance mode is not activated. The first imaging device 102a and the second imaging device 102b may be operable to capture one or more images that correspond to the portion 360 in the rearward-facing direction with respect to the motion of the vehicle 354. With reference to the second orientation 358b, the first imaging device 102a may be operable to be rotated to capture one or more images that correspond to the portion 362 in the sideward-facing or the downward-facing direction of the vehicle 354, when the turn assistance mode is activated. Based on the activation of the first imaging device 102a in sideward-facing direction or downward-facing direction, the first imaging device 102a may be operable to capture a pavement, a pedestrian, a cyclist and/or other obstacles at the intersection of the crossroads 352. The angle of the sideward-facing direction and/or the downward-facing direction of the first imaging device 102a may be adjusted based on an angle of the steering wheel 226.

The one or more images captured by the second imaging device 102b may correspond to the portion 362 in the sideward-facing or the downward-facing direction with respect to the motion of the vehicle 354. The one or more images captured by the second imaging device 102b may correspond to the portion 360 in the rearward-facing direction with respect to the motion of the vehicle 354.

Figure 4A:
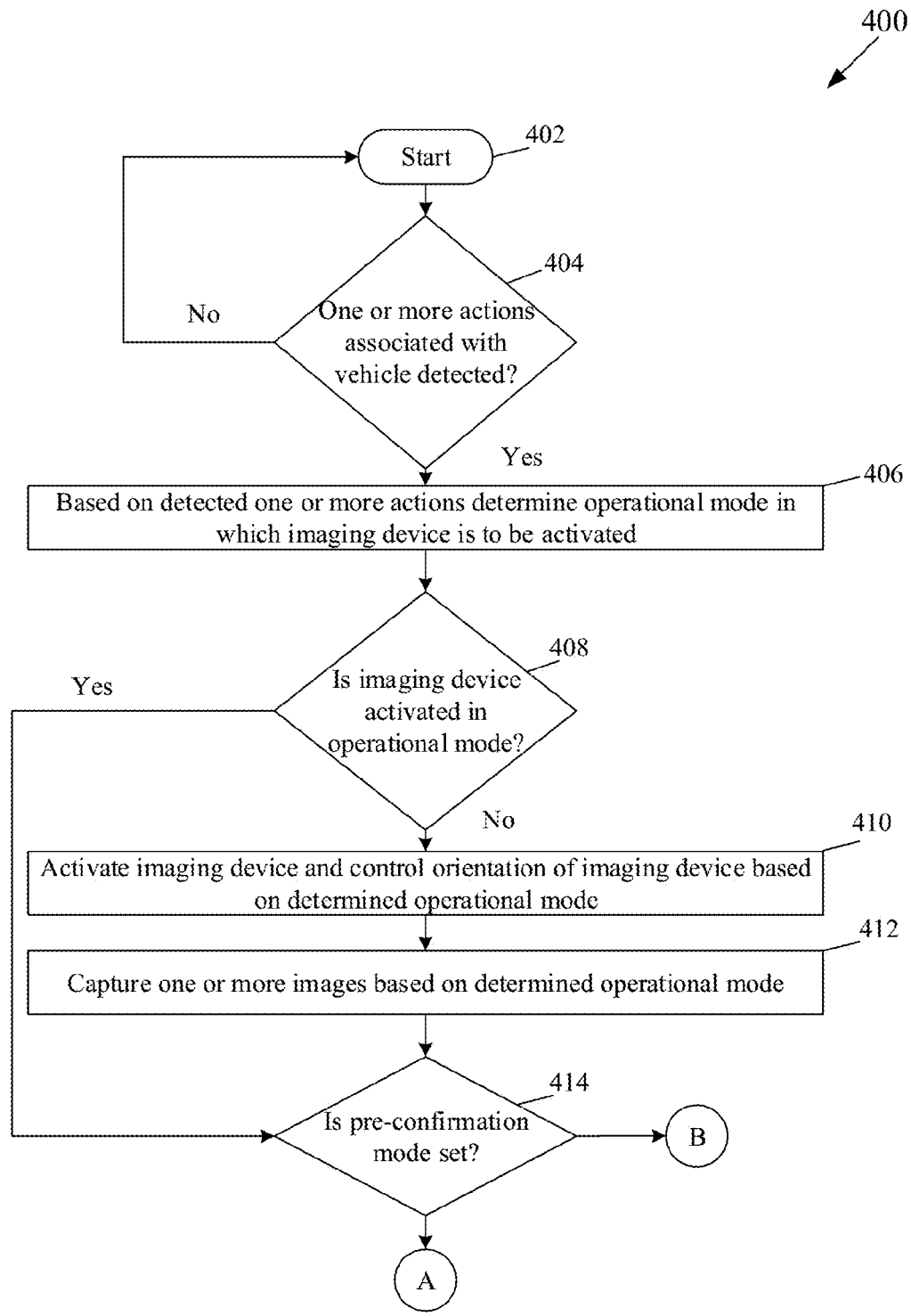
FIGS. 4A and 4B collectively illustrate a flowchart for a method to provide driving assistance, in accordance with an embodiment of the disclosure.
Figure 4B:
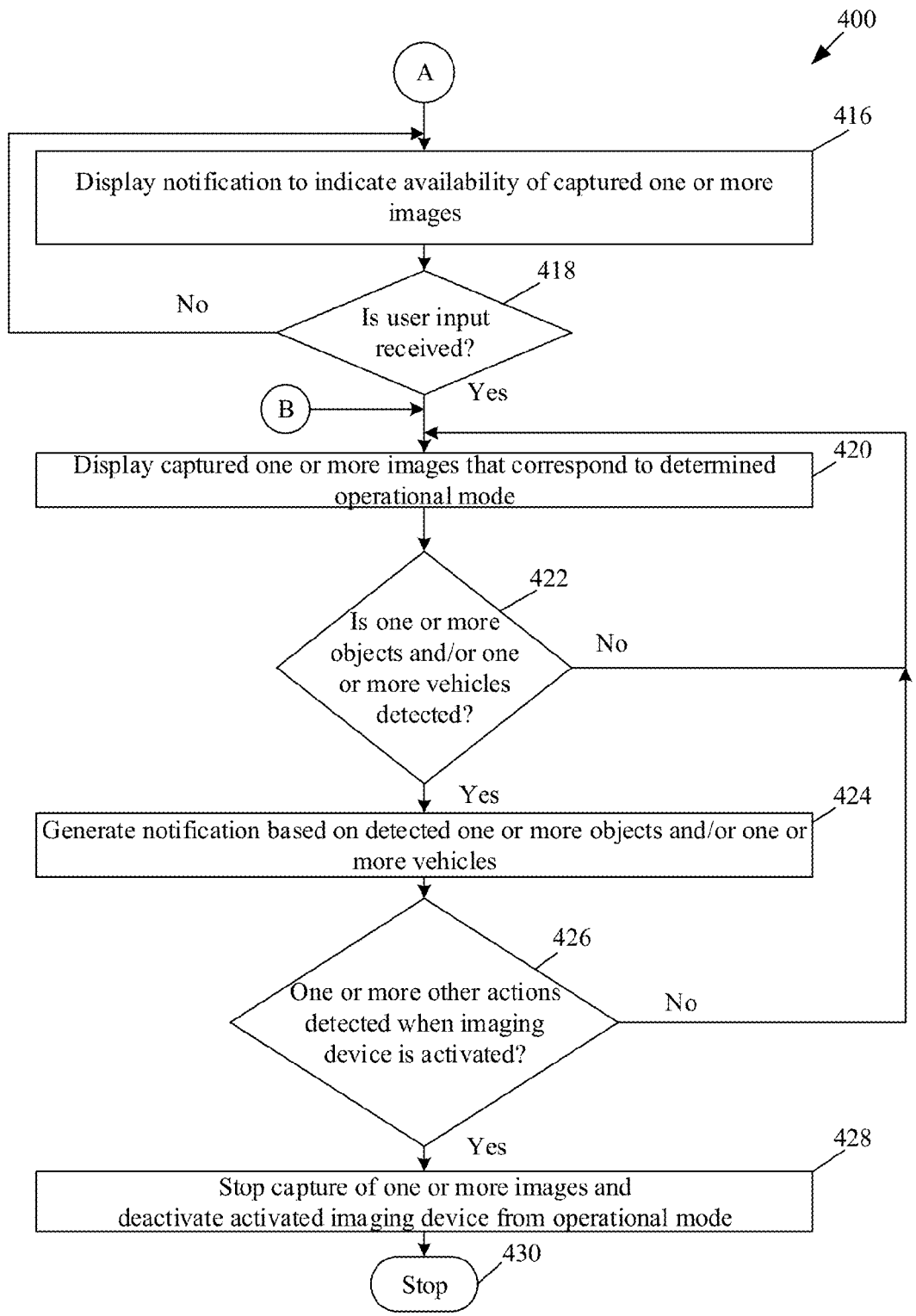

FIGS. 4A and 4B collectively illustrate a flowchart for a method to provide driving assistance, in accordance with an embodiment of the disclosure. With reference to FIGS. 4A and 4B, there is shown a flowchart 400. The flowchart 400 is described in conjunction with FIG. 1 and FIG. 2. The method starts at step 402 and proceeds to step 404.

At step 404, it may be determined whether one or more actions associated with the vehicle 100 are detected. In instances, when one or more actions associated with the vehicle 100 are detected, the control passes to step 406. In instances, when one or more actions associated with the vehicle 100 are not detected, the control passes back to step 402.

At step 406, an operational mode in which the imaging device 102 is to be activated may be determined. The determination of the operational mode may be based on the detected one or more actions. In accordance with an embodiment, the operational mode may correspond to a surpass assistance mode. In accordance with an embodiment, the operational mode may correspond to a turn assistance mode.

In accordance with an embodiment, the surpass assistance mode may be activated based on one or more actions that correspond to the one or more of a deceleration of the vehicle below a pre-defined speed threshold for first mode activation, selection of a manual button for the first mode activation, a lateral displacement of the vehicle above a pre-defined distance threshold for first mode activation, push of a brake pedal of the vehicle, an activation of a turn signal of the vehicle, a presence of another vehicle within a pre-defined proximity range of the vehicle, a low visibility associated with a view in a frontward direction of the vehicle from a driver, a blocking of the view by the another vehicle, a reduction in speed of the other vehicle to a value below a pre-defined speed threshold for first mode activation, and/or a change in a steering angle above a pre-defined angle threshold for first mode activation.

In accordance with an embodiment, the turn assistance mode may be activated based on detected one or more actions that comprise one or more of activation of a turn signal, selection of a manual button for the second mode activation, detection of a lane change by the vehicle, detection of an intersection in a direction of motion of the vehicle, detection of a turn at an intersection on an upcoming driving route set in a navigation application, detection of a reduction in speed of the vehicle to a value below a pre-defined speed threshold for second mode activation, detection of a change in a steering angle above a pre-defined angle threshold for second mode activation, and/or detection of a traffic signal.

At step 408, it may be determined whether the imaging device 102 is activated in an operational mode. In instances, when the imaging device 102 imaging device 102 is activated in the operational mode, the control passes to step 414. In instances, when the imaging device 102 imaging device 102 is not activated in the operational mode, the control passes to step 410.

At step 410, the imaging device 102 may be activated based on the determined operational mode. Further, an orientation of the imaging device 102 may be controlled when the imaging device 102 is activated in the determined operational mode. In accordance with an embodiment, the orientation of the imaging device 102 may be sideward-facing and/or downward-facing with respect to the direction of motion of the vehicle when the operation mode is the turn assistance mode. In accordance with an embodiment, the orientation of the imaging device 102 may be forward-facing with respect to the direction of motion of the vehicle when the operation mode is the surpass assistance mode.

At step 412, one or more images may be captured by the activated imaging device 102 in the determined operational mode. These sequential steps of step 410 and step 412 can be alternatively placed directly before step 420. At step 414, it may be determined whether a pre-confirmation mode for display of captured one or more images is set. In instances, the pre-confirmation mode for the display of the captured one or more images is set, the control passes to 416. In instances, when the pre-confirmation mode for the display of the captured one or more images is not set, the control passes to 420.

At step 416, a notification may be displayed by display device 106a to indicate the availability of the captured one or more images that correspond to the determined operational mode. At step 418, it may be determined whether a user input to display captured one or more images that correspond to the determined operational mode, is received. In instances, when the user input is received, the control passes to step 420. In instances, when the user input is not received, the control passes to step 416.

At step 420, the captured one or more images that correspond to the determined operational mode, may be displayed on the display device 106a. At step 422, it may be determined whether one or more objects and/or one or more vehicles are detected by the sensors of the sensing system 222 of the vehicle 100. In instances, when one or more objects and/or one or more vehicles are detected, the control passes to step 424. In instances, when the one or more objects and/or one or more vehicles are not detected, the control passes to the step 420.

At step 424, based on the detected one or more objects and/or one or more vehicles, a notification may be generated. In accordance with an embodiment, the notification may indicate the presence of the one or more objects. In accordance with an embodiment, the notification may indicate that a passage to surpass the detected one or more other vehicles is not available. The generated notification may be rendered at the display device 106a of the vehicle 100, the electronic instrument cluster 104a, and/or the vehicle steering wheel 104b.

At step 426, it may be determined whether one or more other actions are detected by the sensing devices when the imaging device 102 is activated in one of the operational modes. In instances when one or more other actions are detected, the activated imaging device 102 may be deactivated. In accordance with an embodiment, the deactivation of the activated imaging device from the activated operational mode may be based on acceleration of the vehicle above a pre-defined speed threshold for a mode deactivation, a lateral displacement of the vehicle below a pre-defined distance threshold for mode deactivation, an absence of one or more other vehicles from the captured one or more images, a change in the lateral displacement with respect to a time of activation of the imaging device, a change in a steering angle below an angle threshold for mode deactivation, a detection of a completion of a turning action of the vehicle at an intersection, deactivation of a turn signal, and/or selection of a manual button for the deactivation. The one or more other actions performed for the deactivation may be complementary to the one or more actions performed for the activation of the imaging device 102. In instances, when the one or more other actions are not detected, the control passes back to step 420. In instances, when the one or more other actions are detected, the control passes to step 428. At step 428, the imaging device 102 may be deactivated and the display of the captured one or more images on the display device 106a may be stopped. The control passes to end step 430.

In accordance with an embodiment of the disclosure, the system to provide driving assistance may comprise one or more circuits, such as the ECU 202 (as shown in FIG. 2). The ECU 202 may be operable to detect one or more actions associated with the vehicle 100. The detected one or more actions may be based on one or more signals generated by one or more sensors embedded in the vehicle 100. The ECU 202 may be further operable to control the activation of an imaging device 102 located at an opposite side of a driver of the vehicle 100, based on the detected one or more actions. The imaging device 102 may be operable to capture one or more images in a forward-facing direction of the vehicle 100.

Various embodiments of the disclosure may provide a non-transitory, computer readable medium and/or storage medium stored thereon, a machine code and/or a computer program with at least one code section executable by a machine and/or a computer to provide driving assistance. The at least one code section may cause the machine and/or computer to perform the steps that comprise detection of one or more actions associated with the vehicle, by an electronic control unit used in the vehicle. The detection of the one or more actions may be based on one or more signals generated by one or more sensors embedded in the vehicle. The activation of an imaging device located on the vehicle at an opposite side of a driver of the vehicle, may be controlled by the electronic control unit used in the vehicle. The control of the activation of the imaging device may be based on the detected one or more actions. Further, the imaging device may be operable to capture one or more images in a forward-facing direction of the vehicle.

In accordance with an embodiment of the disclosure, the vehicle 100 (FIG. 1) may include at least the battery 230 associated with the vehicle power system 228 (FIG. 2), the sensing system 222 (FIG. 2) embedded in the vehicle 100, an imaging device 102 (FIG. 1) located at the opposite side 108b (FIG. 1) to the driver side 108a (FIG. 1) of the vehicle 100, the display device 106a (FIG. 2), and/or the electronic control unit (ECU) 202 (FIG. 2). The sensing system 222 of the vehicle 100 may be configured to capture one or more images in a forward-facing direction of the vehicle. The display device 106a may be configured to render the captured one or more images. The ECU 202 may comprise one or more circuits that may be configured to detect one or more actions associated with the vehicle 100 based on one or more signals generated by the sensing system 222 embedded in the vehicle 100. The one or more circuits of the ECU 202 may be further configured to control the activation of the imaging device 102 located the opposite side 108b to the driver side 108a of the vehicle 100. The activation may be controlled based on the detected one or more actions and/or the captured one or more images.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for driving assistance, said system comprising:
   circuitry in an electronic control unit in a first vehicle, said circuitry configured to:
     detect an action associated with said first vehicle based on a signal generated by a sensor embedded in said first vehicle; and
     control activation of a camera located on said first vehicle based on said detected action,
       wherein said camera captures an image in a forward-facing direction of said first vehicle,
       wherein said camera is located on said first vehicle at a first side opposite to a second side of a driver of said first vehicle,
       wherein said activation of said camera corresponds to rotation of said camera from a rearward-facing direction of said first vehicle to said forward-facing direction of said first vehicle based on said detected action, and wherein said detected action corresponds to a first change in a steering angle of said first vehicle above a first threshold angle.

2. The system according to claim 1, wherein said circuitry is further configured to control said activation of said camera in an operational mode, wherein said operational mode corresponds to one of a first mode or a second mode, wherein said first mode and said second mode are based on at least one of said detected action or said image captured by said camera, and wherein in said first mode, said first vehicle surpasses a second vehicle in front of said first vehicle, and in said second mode, said first vehicle turns at a first intersection in a direction of motion of said first vehicle.

3. The system according to claim 2, wherein said circuitry is further configured to:

control said activation of said camera to capture said image in said forward-facing direction for said first mode; and detect said second vehicle in front of said first vehicle based on said detected action, wherein said detected action comprises at least one of a deceleration of said first vehicle below a speed threshold for activation of said first mode, selection of a manual button for said activation of said first mode, lateral displacement of said first vehicle above a threshold distance for said activation of said first mode, push of a brake pedal of said first vehicle, activation of a turn signal of said first vehicle, a presence of a third vehicle within a specific distance from said first vehicle, a blockage in a view in said forward-facing direction of said first vehicle for said driver of said first vehicle, reduction in a speed of said second vehicle to a value below said speed threshold for said activation of said first mode, or said first change in said steering angle of said first vehicle above said first threshold angle for said activation of said first mode.

4. The system according to claim 2, wherein said circuitry is further configured to:

control said activation of said camera to capture said image in at least one of said rearward-facing direction or a sideward-facing direction of said first vehicle for said second mode; and detect at least one of an obstacle or a life-form based on said detected action, wherein said detected action comprises at least one of activation of a turn signal of said first vehicle, selection of a manual button for activation of said second mode, detection of a lane change by said first vehicle, detection of said first intersection in said direction of motion of said first vehicle, detection of a turn at a second intersection on an upcoming driving route set in a navigation application for said first vehicle, detection of reduction in a speed of said first vehicle to a value below a speed threshold for said activation of said second mode, detection of a second change in said steering angle of said first vehicle above a second threshold angle for activation of said second mode, or detection of a traffic signal.

5. The system according to claim 1, wherein said circuitry is further configured to at least one of control a display of said image on a display screen of said first vehicle or display an alert indication with said image, wherein said alert indication is displayed based on detection of at least one of a second vehicle or a life-form, wherein said second vehicle or said life-form is detected based on said image.

6. The system according to claim 1, wherein said activation of said camera further corresponds to adjustment of a line-of-sight of said camera.

7. The system according to claim 1, wherein said circuitry is further configured to control adjustment of a line-of-sight of said activated camera based on road surface characteristics of a road surface beneath said first vehicle, wherein said road surface characteristics comprise at least one of an upward slope, a downward slope, a bank angle, a curvature, a boundary, a speed limit, a road texture, a pothole, or a lane marking.

8. The system according to claim 1, wherein said circuitry is further configured to control said activation of said camera based on at least one of a voice based command, a gesture-based command, or selection of a manual button on one of a panel or a steering wheel of said first vehicle.

9. The system according to claim 1, wherein said circuitry is further configured to control display of said image based on one of an infotainment display, a heads-up display (HUD), an augmented reality (AR)-HUD, a driver information console (DIC), a see-through display, or a smart-glass display.

10. The system according to claim 1, wherein said circuitry is further configured to deactivate said activated camera based on at least one of an acceleration of said first vehicle above a speed threshold for a mode deactivation, a lateral displacement of said first vehicle below a threshold distance for said mode deactivation, an absence of a fifth vehicle from said image, a second change in said lateral displacement with respect to a time of activation of said camera, a third change in said steering angle of said first vehicle below a third threshold angle for said mode deactivation, detection of completion of a turning action of said first vehicle at an intersection, deactivation of a turn signal, or selection of a manual button for said deactivation.

11. The system according to claim 1, wherein said circuitry is further configured to generate information indicating whether said first vehicle is capable to safely pass a second vehicle in front of said first vehicle, wherein said information is generated based on said activation of said camera, wherein said generated information comprises at least one of visual information, haptic information, or audio information.

12. The system according to claim 1, wherein said circuitry is further configured to detect a third vehicle within a specific distance from said first vehicle based on at least one of said camera, a radio wave-based object detection device, a laser-based object detection device, or a wireless communication device.

13. The system according to claim 1, wherein said camera is one of mounted on or integrated into one of a passenger side rear-view mirror or an external body of said first vehicle.

14. The system according to claim 1, wherein said camera is adjustably mounted on one of a passenger side rear-view mirror or an external body of said first vehicle, wherein said camera captures said image in at least one of said rearward-facing direction or a sideward-facing direction of said first vehicle.

15. The system according to claim 1, wherein said camera one of extends outward from an external body of said first vehicle or retracts into said external body of said first vehicle, based on said first change in said steering angle of said first vehicle above said first threshold angle.

16. A method for driving assistance, said method comprising:
   detecting, by an electronic control unit in a first vehicle, an action associated with said first vehicle based on a signal generated by a sensor embedded in said first vehicle; and
   controlling, by said electronic control unit in said first vehicle, activation of a camera located on said first vehicle based on said detected action,
   wherein said camera captures an image in a forward-facing direction of said first vehicle,
   wherein said camera is located on said first vehicle at a first side opposite to a second side of a driver of said first vehicle,
   wherein said activation of said camera corresponds to rotation of said camera from a rearward-facing direction of said first vehicle to said forward-facing direction of said first vehicle based on said detected action, and
   wherein said detected action corresponds to a change in a steering angle of said first vehicle above a threshold angle.

17. The method according to claim 16, further comprising:
   controlling said activation of said camera in an operational mode,
   wherein said operational mode corresponds to one of a first mode or a second mode, and
   wherein said first mode and said second mode are based on at least one of said detected action or said image captured by said camera,
   wherein in said first mode, said first vehicle surpasses a second vehicle in front of said first vehicle, and
   in said second mode, said first vehicle turns at a first intersection in a direction of motion of said first vehicle.

18. The method according to claim 16, further comprising at least one of controlling a display of said image on a display screen of said first vehicle or displaying an alert indication with said image,
   wherein said alert indication is displayed based on detection of at least one of a third vehicle or a life-form, wherein said third vehicle or said life-form is detected based on said image.

19. The method according to claim 16, wherein said activation of said camera further corresponds to adjustment of a line-of-sight of said camera.

20. A non-transitory computer-readable medium having stored thereon computer-executable instructions that, when executed by a processor, cause a computer to execute operations, said operations comprising:
   detecting, by an electronic control unit in a vehicle, an action associated with said vehicle based on a signal generated by a sensor embedded in said vehicle; and
   controlling, by said electronic control unit in said vehicle, activation of a camera located on said vehicle based on said detected action,
   wherein said camera captures an image in a forward-facing direction of said vehicle,
   wherein said camera is located on said vehicle at a first side opposite to a second side of a driver of said vehicle,
   wherein said activation of said camera corresponds to rotation of said camera from a rearward-facing direction of said vehicle to said forward-facing direction of said vehicle based on said detected action, and
   wherein said detected action corresponds to a change in a steering angle of said vehicle above a threshold angle.

21. A vehicle, comprising:
   a battery;
   a sensor configured to generate a signal associated with said vehicle;
   a camera configured to be powered by said battery and capture an image in a forward-facing direction of said vehicle,
   wherein said camera is located on said vehicle at a first side opposite to a second side of a driver of said vehicle, and
   wherein activation of said camera corresponds to rotation of said camera from a rearward-facing direction of said vehicle to said forward-facing direction of said vehicle based on an action associated with said vehicle, and
   wherein said action corresponds to a change in a steering angle of said vehicle above a threshold angle;
   a display configured to render said image; and
   circuitry in an electronic control unit (ECU), said circuitry configured to:
      detect said action associated with said vehicle based on said signal generated by said sensor embedded in said vehicle; and
      control said activation of said camera located on said vehicle based on at least one of said detected action or said image.

* * * * *